US012190875B1

(12) United States Patent
Fidler et al.

(10) Patent No.: US 12,190,875 B1
(45) Date of Patent: Jan. 7, 2025

(54) PREEMPTIVE WAKEWORD DETECTION

(71) Applicant: Amazon Technologies, Inc., Seattle, WA (US)

(72) Inventors: Eli Joshua Fidler, Toronto (CA); Aaron Challenner, Cambridge, MA (US); Zoe Adams, Orange County, CA (US); Sree Hari Krishnan Parthasarathi, Toronto (CA); Gengshen Fu, Sharon, MA (US)

(73) Assignee: Amazon Technologies, Inc., Seattle, WA (US)

( * ) Notice: Subject to any disclaimer, the term of this patent is extended or adjusted under 35 U.S.C. 154(b) by 734 days.

(21) Appl. No.: 17/490,572

(22) Filed: Sep. 30, 2021

(51) Int. Cl.
G10L 15/00 (2013.01)
G10L 15/02 (2006.01)
G10L 15/22 (2006.01)
G10L 15/08 (2006.01)
G10L 15/187 (2013.01)

(52) U.S. Cl.
CPC .............. *G10L 15/22* (2013.01); *G10L 15/02* (2013.01); *G10L 15/08* (2013.01); *G10L 15/187* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/14; G10L 15/197; G10L 15/187; G10L 25/78; G10L 25/87; G10L 21/0208; G10L 15/16; G10L 25/27; G10L 25/30; G10L 19/00; G10L 19/005
See application file for complete search history.

(56) References Cited

PUBLICATIONS

Arik, et al., "Convolutional recurrent neural networks for small-footprint keyword spotting," CoRR, vol. abs/1703.05390, 2017, 5 pages.
Rich Caruana, "Multitask learning," Machine Learning, vol. 28, 35 pages.
Ceolini, et al., "Event-driven pipeline for low-latency low-compute keyword spotting and speaker verification system," in ICASSP 2019—2019 IEEE International Conference on Acoustics, Speech and Signal Processing (ICASSP), 2019, 7 pages.
Chen, et al. "Small-footprint keyword spotting using deep neural networks," in 2014 IEEE International Conference on Acoustics, Speech and Signal Processing (ICASSP), 2014, 5 pages.
Du, et al., "Low-latency convolutional recurrent neural network for keyword spotting," in 2018 Joint 10th International Conference on Soft Computing and Intelligent Systems (SCIS) and 19th International Symposium on Advanced Intelligent Systems (ISIS), 2018, 3 pages.

(Continued)

*Primary Examiner* — Vu B Hang
(74) *Attorney, Agent, or Firm* — Pierce Atwood LLP

(57) ABSTRACT

Systems and methods for preemptive wakeword detection are disclosed. For example, a first part of a wakeword is detected from audio data representing a user utterance. When this occurs, on-device speech processing is initiated prior to when the entire wakeword is detected. When the entire wakeword is detected, results from the on-device speech processing and/or the audio data is sent to a speech processing system to determine a responsive action to be performed by the device. When the entire wakeword is not detected, on-device processing is canceled and the device refrains from sending the audio data to the speech processing system.

20 Claims, 15 Drawing Sheets

(56) References Cited

PUBLICATIONS

Kumar, et al., "On convolutional lstm modeling for joint wake-word detection and text dependent speaker verification," in Interspeech, 2018, 5 pages.
Panchapagesan, et al. "Multi-task learning and weighted cros-sentropy for dnn-based keyword spotting," in Interspeech, 2016, 5 pages.
Sainath, et al. "Convolutional neural networks for small-footprint keyword spotting," in Interspeech, 2015, 5 pages.
Seo, et al., "Temporal convolution for realtime keyword spotting on mobile devices," in Interspeech, 2019. 5 pages.
Sigtia, et al., "Progressive voice trigger detection Accuracy vs latency," in ICASSP 2021—2021 IEEE International Conference on Acoustics, Speech and Signal Processing 2021, 5 pages.
Sun, et al., "Max pooling loss training of long short-term memory networks for small-footprint keyword spotting," in Spoken Language Technology Workshop (SLT), 2016 IEEE, 15 pages.
Tang, et al. "Deep residual learning for small-footprint keyword spotting," 2018 IEEE International Conference on Acoustics, Speech and Signal Processing (ICASSP), 5 pages.
Tucker, et al. "Model compression applied to small-footprint keyword spotting," in Interspeech, 2016. 5 pages.
Yamamoto, et al., "Small-footprint magic word detection method using convolutional lstm neural network," in Interspeech, 2019, 5 pages.
Zhang, et al., "Autokws: Keyword spotting with differentiable architecture search," ICASSP 2021—2021 IEEE International Conference on Acoustics, Speech and Signal Processing (ICASSP), 3 pages.

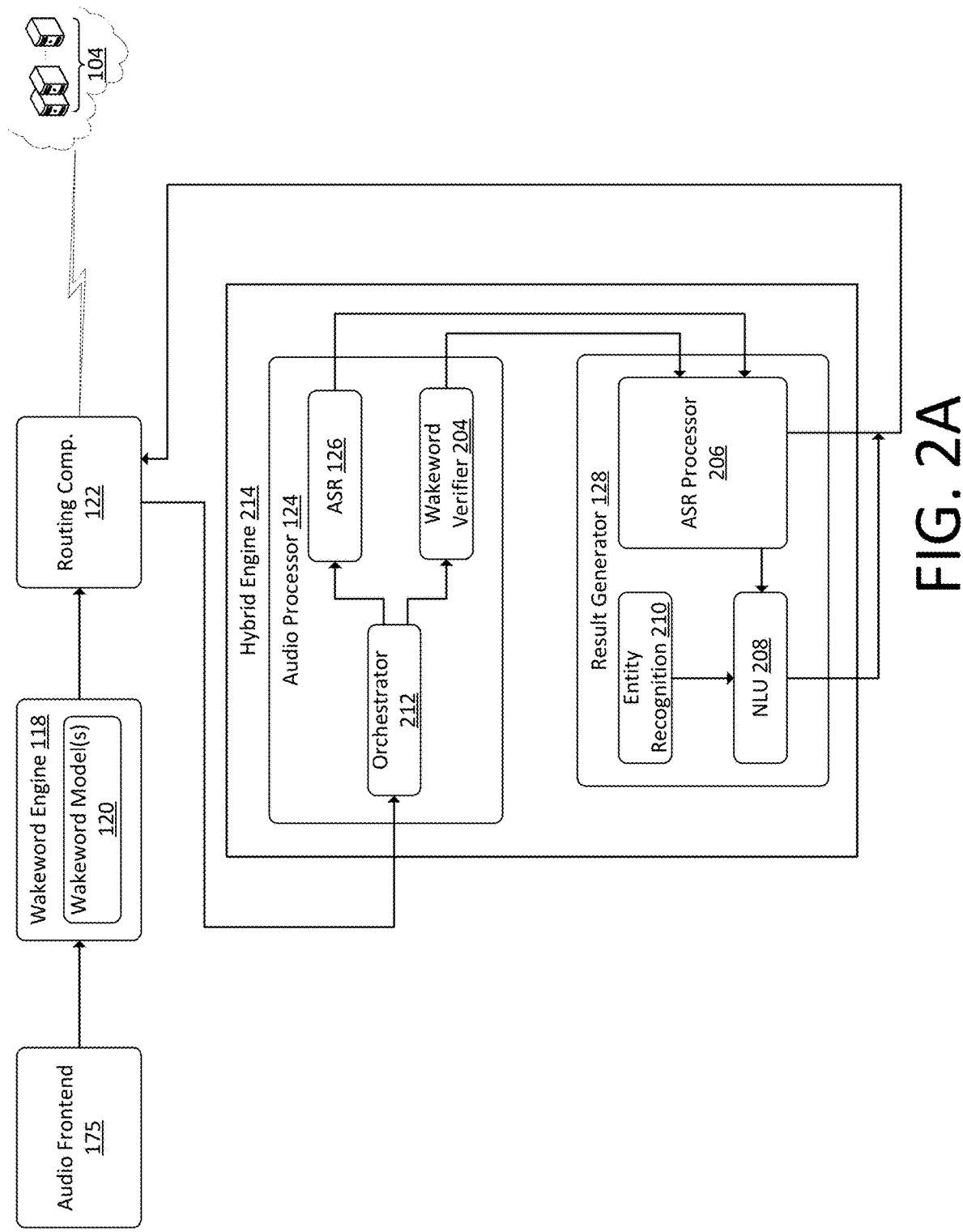

PREEMPTIVE WAKEWORD DETECTION

BACKGROUND

Voice interface devices have become more common in homes and other environments. Processing of voice commands is an important consideration for these devices. Described herein are improvements in technology and solutions to technical problems that can be used to, among other things, enhance processing of voice commands.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A illustrates a conceptual diagram of example components for preemptive wakeword detection.

DETAILED DESCRIPTION

Figure 1A:
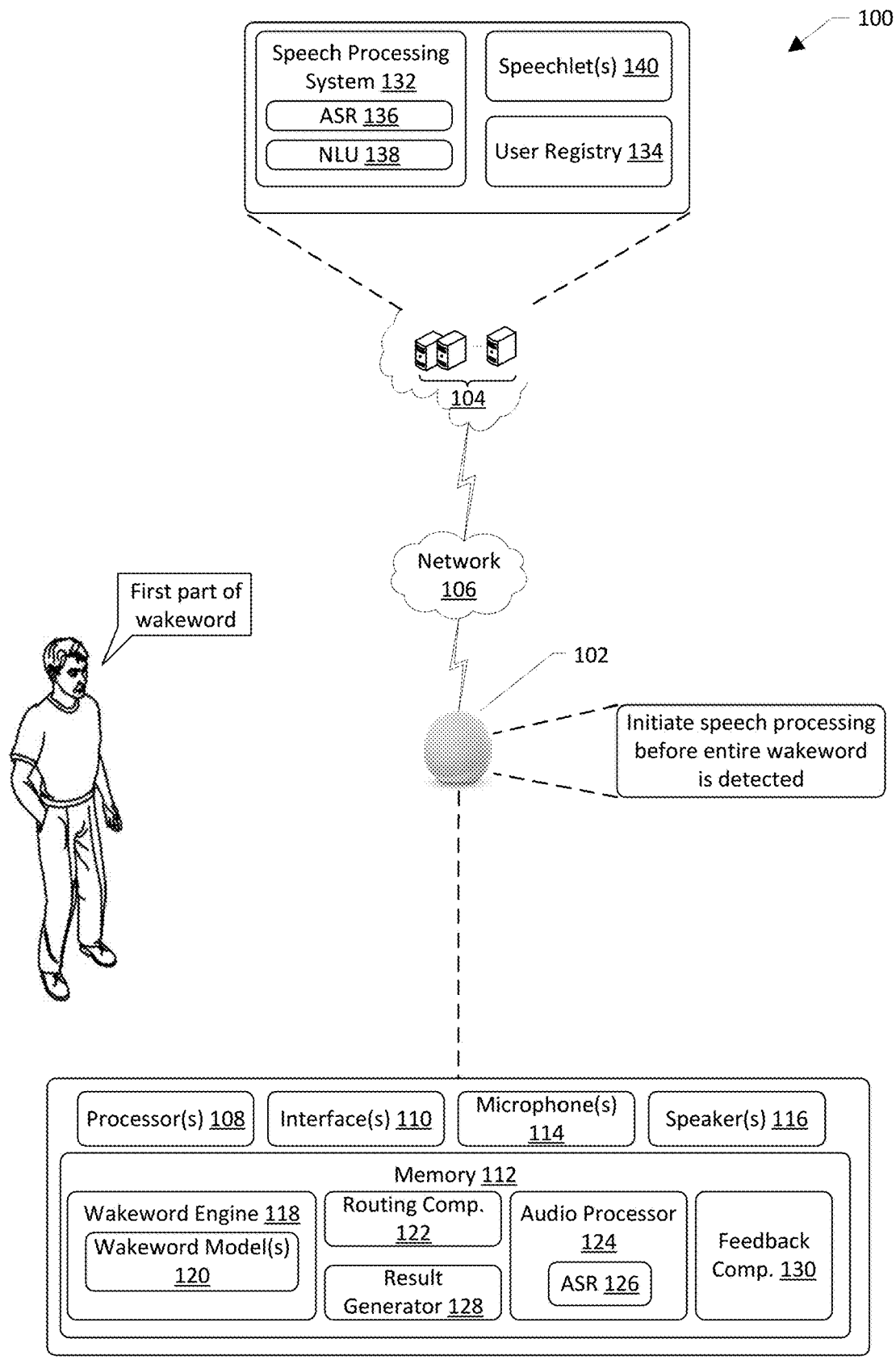
FIG. 1A illustrates a schematic diagram of an example environment for preemptive wakeword detection.

Systems and methods for preemptive wakeword detection are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

Generally, voice interface devices may be configured with one or more microphones that may be utilized for capturing sound within an environment in which the voice interface devices are situated. The voice interface devices may generate audio data corresponding to the captured sounds and the audio data may be processed. For example, when the audio data represents utterances from one or more users, automatic speech recognition may be utilized to generate text or other meaning representation ("ASR output") data indicating words of the utterances. Additionally, natural language understanding may be utilized to determine intent data associated with the ASR output data. For example, an utterance may be "turn on the kitchen light." Automatic speech recognition may be utilized to determine the text data "turn on the kitchen light" from generated audio data, and natural language understanding may be utilized to determine that the utterance is associated with a "turn on appliance" intent, with the requested appliance being "kitchen light." It should be understood that speech processing of audio data may include automatic speech recognition and/or natural language understanding, and need not include both. Additionally, in examples, entity recognition may be utilized to generate the intent data as described herein (e.g., identify the specific light, including networking address, known as "kitchen light" for that particular user). Additional details on the use of automatic speech recognition, natural language understanding, and entity recognition are provided below.

Speech processing techniques may be performed by the voice interface device and/or other devices communicatively coupled to the voice interface device. For example, once the voice interface device generates the audio data representing an utterance, the voice interface device can send the audio data to a remote system for speech processing. In this example, the system may be a robust, distributed system with a relatively large amount of computing resources, computing power, and processes for accurately generating the intent data and then determining what command to associate with the intent data. While this process of utilizing a system for at least a portion of the speech processing is likely to lead to an accurate result, some use cases may be improved and/or made available with less resources. To improve efficiency and may be other things (e.g., latency, privacy, reliability, etc.), at least a portion of the speech processing may be performed by the voice interface device being used by the user and/or another device close to the user (e.g., in the same building, on the same network, etc.).

In all of these examples, initiation of speech processing whether on-device or at a system other than the device may be based at least in part on detection of a wakeword from user speech. For example, users may speak in an environment where the device is situated. However, the device may not perform the speech processing techniques described herein until the device detects a wakeword indicating that the user speech is directed to the device and that the user is requesting an action associated with the device be performed. For example, in the user speech "Alexa, turn on the kitchen light." The word "Alexa" may be the wakeword. Once detected, the device and/or the system may process the audio data corresponding to the user utterance to perform an action, here causing the kitchen light to be turned on.

When a wakeword is utilized, performance of automatic speech recognition and natural language understanding on the device and/or the sending of audio data to the system for speech processing may not occur until the wakeword is detected. This, among other things, helps prevent audio data representing user speech from being inadvertently sent from the device and reduces the wasting of computing power. However, given that the computing operations for detecting the wakeword take time to perform, processing of the audio data to determine what action to perform can be delayed until the wakeword is detected, adding latency to the user experience. In examples where the user utterance is short, such as "Alexa, stop," the period of time between when the user stops speaking and when the requested action is performed may be perceptible to the user and detract from the user experience.

In this and other examples, preemptive detection of a wakeword may be desirable. To do so, a wakeword engine of the device may be configured with one or more wakeword models. Each wakeword model may be configured to analyze audio data representing user utterances to determine if at least a portion of the audio data includes one or more wakewords. Additionally, at least one of the wakeword models may be configured to analyze the audio data to determine if a first part of the wakeword has been spoken. For example, the wakeword model may be configured to detect "Al," and/or "Ale," and/or "Alex" from the audio data. Additional details on how the wakeword models detect wakewords and portions of wakewords from audio data is provided below. By detecting the first part of the wakeword, the wakeword engine may be able to provide an indication of this likely wakeword detection to a routing component of the device.

The routing component may be configured to receive the likely wakeword detection indication and send a command to one or more other components of the device to initiate speech processing on the audio data. By initiating speech processing prior to detection of the entire wakeword, the device is more likely to complete the speech processing sooner in time from when the user finishes speaking than would be possible if the device waiting until the entire wakeword was detected, decreasing latency in the response time of the device. Additionally, the routing component may be configured to refrain from sending the audio data to the speech processing system based at least in part on the detection indication being a likely wakeword detection instead of detection of the entire wakeword. This may prevent the audio data from leaving the device and/or a device associated with the user's environment until the entirety of the wakeword is detected.

The command from the routing component may be received at an audio processor of the device. The audio processor may be configured to perform one or more operations. Those operations may include initiating automatic speech recognition processing on the audio data to determine words corresponding to the user utterance. The operations may also include performing speaker identification tasks, audio signature fingerprinting, wakeword verification, and/or other operations. In examples, the audio processor, having initiated automatic speech recognition, may determine if the results of the initial processing indicate that one of the words in the user utterance corresponds to the wakeword. For example, when the results include text data, corresponding text of "Alexa, turn on the kitchen light" may include the entire wakeword, here "Alexa." In these examples, the audio processor may generate an indication that the entire wakeword was detected from the results. In other examples, the text data may indicate that the user utterance did not include the entire wakeword, such as when the user says "hey Al, turn on the kitchen light." In these examples, the audio processor may generate an indication that the entire wakeword was not detected from the results.

In addition, and/or alternatively from the audio processor detecting the entire wakeword, the wakeword engine may be configured to detect the entire wakeword. As described above, one or more of the wakeword models may be configured to detect the entire wakeword subsequent to when the first part of the wakeword is detected. In examples, the same wakeword model that is configured to detect the first part of the wakeword may also be configured to detect the entire wakeword. In other examples, a first wakeword model may be configured to detect the first part of the wakeword while a second wakeword model may be configured to detect the entirety of the wakeword. In examples where the entirety of the wakeword is detected, whether by the wakeword engine and/or the audio processor, an indication that the entire wakeword has been detected may be sent to the routing component. The routing component may then send the audio data representing the user utterance to the speech processing system based at least in part on receiving the indication that the entire wakeword has been detected. Additionally, when the entire wakeword is detected, the device may continue speech processing as described herein. When the entire wakeword is not detected, the wakeword engine and/or the audio processor may send an indication that the entire wakeword was not detected to the routing component. The routing component may determine to refrain from sending the audio data to the speech processing system based at least in part on receiving the indication that the entire wakeword was not detected. Additionally, the device may cause the speech processing being performed on the device to be canceled or otherwise prevent further speech processing from being performed based at least in part on the indication that the entire wakeword was not detected.

When the entire wakeword is detected, and/or prior to a determination of whether the entire wakeword is detected, a result generator may continue processing the audio data and/or the text data. The speech processing performed by the result generator may include, for example, additional automatic speech recognition, natural language understanding, entity recognition, and/or command generation from one or more applications residing on the device. In instances where the entire wakeword is detected, result data from the result generator may be sent to the system for further processing and/or use for generating a command in response to the user utterance. By so doing, the device may be able to perform at least a portion of the speech processing and provide results thereof to the speech processing system to decrease the processing performed by that speech processing system, leading to decreased latency between when the user stops speaking and when the responsive command is performed.

Additionally, the device may include a feedback component that may be configured to determine when detection thresholds associated with the likely wakeword detection should be adjusted. For example, the wakeword models may be initially trained to detect the likely wakeword using a first threshold. However, over a period of time, feedback data may be collected and/or generated indicating how frequently a likely wakeword detection also corresponded to an entire wakeword detection for the same sample audio data. If the feedback data indicates that the likely wakeword detection is not frequently accompanied by the entire wakeword detection, this data may indicate that the likely wakeword detection threshold should be adjusted to more closely align with the entire wakeword detection. If the feedback data indicates that the likely wakeword detection is always or nearly always accompanied by the entire wakeword detection, this data may indicate that the likely wakeword detection threshold should be relaxed such that more likely wakeword detections occur.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1A illustrates a schematic diagram of an example system 100 for preemptive wakeword detection. The system 100 may include, for example, one or more devices 102. In certain examples, the devices 102 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102 may be configured to send data to and/or receive data from a system 104, such as via a network 106. It should be understood that where operations are described herein as being performed by the system 104, some or all of those operations may be performed by the devices 102. It should also be understood that anytime the system 104 is referenced, that system may include any system and/or device, whether local to an environment of the devices 102 or otherwise, unless specifically noted to be local and/or remote in a given example. Additionally, it should be understood that a given space and/or environment may include numerous devices 102. It should also be understood that when a "space" or "environment" is used herein, those terms mean an area and not necessarily a given room, building, or other structure, unless otherwise specifically described as such.

The devices 102 may include one or more components, such as, for example, one or more processors 108, one or more network interfaces 110, memory 112, one or more microphones 114, and/or one or more speakers 116. The microphones 114 may be configured to capture audio, such as user utterances, and generate corresponding audio data. The speakers 116 may be configured to output audio, such as audio corresponding to audio data received from another device and/or the system 104. The devices 102 may also include displays that may be configured to display images corresponding to image data, such as image data received from the system 104 and/or one or more other devices. The memory 112 may include components such as, for example, a wakeword engine 118 including one or more wakeword models 120, a routing component 122, an audio processor 124 including an automatic speech recognition (ASR) component 126, a result generator 128, and/or a feedback component 130. Each of these components of the memory 112 will be described in detail below.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 106 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 104 may include components such as, for example, a speech processing system 132, a user registry 134, and/or one or more speechlets 140. It should be understood that while the components of the system 104 are depicted and/or described as separate from each other in FIG. 1A, some or all of the components may be a part of the same system. The speech processing system 132 may include an automatic speech recognition component (ASR) 136 and/or a natural language understanding component (NLU) 138. Each of the components described herein with respect to the system 104 may be associated with their own systems, which collectively may be referred to herein as the system 104, and/or some or all of the components may be associated with a single system. Additionally, the system 104 may include one or more applications, which may be described as skills. "Skills," as described herein may be applications and/or may be a subset of an application. For example, a skill may receive data representing an intent. For example, an intent may be determined by the NLU component 138 and/or as determined from user input via a computing device. Skills may be configured to utilize the intent to output data for input to a text-to-speech component, a link or other resource locator for audio data, and/or a command to a device, such as the devices 102. "Skills" may include applications running on devices, such as the devices 102, and/or may include portions that interface with voice user interfaces of devices 102.

In instances where a voice-enabled device is utilized, skills may extend the functionality of devices 102 that can be controlled by users utilizing a voice-user interface. In some examples, skills may be a type of application that may be useable in association with connected devices and may have been developed specifically to work in connection with given connected devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the devices 102 and the system 104 are described in detail below. In examples, some or each of the components of the system 104 may include their own processor(s), network interface(s), and/or memory. As such, by way of example, the speech processing system 132 may include and/or be associated with processor(s), network interface(s), and/or memory. The other components of the system 104, such as the speechlets 140, may include and/or be associated with different processor(s), network interface(s), and/or memory, or one or more of these components may utilize some or all of the same processor(s), network interface(s), and/or memory utilized by the speech processing system 132. These components are described in detail below. Additionally, the operations and/or functionalities associated with and/or described with respect to the components of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 104, the user registry 134 may be configured to determine and/or generate associations between users, user accounts, environment identifiers, and/or devices. For example, one or more associations between user accounts may be identified, determined, and/or generated by the user registry 134. The user registry 134 may additionally store information indicating one or more applications and/or resources accessible to and/or enabled for a given user account. Additionally, the user registry 134 may include information indicating device identifiers, such as naming identifiers, associated with a given user account, as well as device types associated with the device identifiers. The user registry 134 may also include information indicating user account identifiers, naming indicators of devices associated with user accounts, and/or associations between devices, such as the devices 102. The user registry 134 may also include information associated with usage of the devices 102. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data. As described herein, the user registry 130 may be considered a registry of devices for given account data.

The speech-processing system 132 may be configured to receive audio data from the primary devices 102 and/or other devices and perform speech-processing operations. For example, the ASR component 136 may be configured to generate text data corresponding to the audio data, and the NLU component 138 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "order ice cream," the NLU component 138 may identify a "order" intent and the payload may be "ice cream." In this example where the intent data indicates an intent to purchase ice cream to be delivered to an environment, the speech processing system 132 may call one or more speechlets 140 to effectuate the intent. Speechlets, as described herein may otherwise be described as applications and may include functionality for utilizing intent data to generate directives and/or instructions. For example, an application associated ordering food may be called. The application may be designated as being configured to handle the intent of ordering food, for example. The application may receive the intent data and/or other data associated with the user utterance from the NLU component 138, such as by an orchestrator of the system 104, and may perform operations to place an order for ice cream to be delivered to a given environment, for example. The system 104 may generate audio data confirming that the order has been placed, such as by a text-to-speech component. The audio data may be sent from the system 104 to one or more of the devices 102.

The components of the system 100 are described below by way of example. For example, initiation of speech processing whether on-device or at a system 104 other than the device 102 may be based at least in part on detection of a wakeword from user speech. For example, users may speak in an environment where the device 102 is situated. However, the device 102 may not perform the speech processing techniques described herein until the device 102 detects a wakeword indicating that the user speech is directed to the device 102 and that the user is requesting that an action associated with the device 102 be performed. For example, in the user speech "Alexa, turn on the kitchen light." The word "Alexa" may be the wakeword. Once detected, the device 102 and/or the system 104 may process the audio data corresponding to the user utterance to perform an action, here causing the kitchen light to be turned on.

When a wakeword is utilized, performance of ASR and NLU on the device 102 and/or the sending of audio data to the system 104 for speech processing does not occur until the wakeword is detected. This, among other things, prevents audio data representing user speech from being needlessly sent away from the device 102 and prevents the device 102 from wasting computing power. However, given that the computing operations for detecting the wakeword take a period of time to perform, processing of the audio data to determine what action to perform is delayed until the wakeword is detected, adding latency to the user experience. In examples where the user utterance is short, such as "Alexa, stop," the period of time between when the user stops speaking and when the requested action is performed may be perceptible to the user and detract from the user experience.

In this and other examples, preemptive detection of a wakeword may be desirable. To do so, the wakeword engine 118 may be configured with the one or more wakeword models 120. The wakeword models 120 may be configured to analyze audio data representing user utterances to determine if at least a portion of the audio data includes the wakeword. Additionally, at least one of the wakeword models 120 may be configured to analyze the audio data to determine if a first part of the wakeword has been spoken. For example, the wakeword model 120 may be configured to detect "Al," and/or "Ale," and/or "Alex" from the audio data. For example, the wake word engine 118 works in conjunction with other components of the device 102, for example the microphone 114 to detect keywords in audio data. For example, the device may convert audio into audio data, and process the audio data with the wake word engine 118 to determine whether human sound is detected, and if so, if the audio data comprising human sound matches an audio fingerprint and/or model corresponding to a particular keyword.

The device 102 may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 102 may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by device 102 (or separately from human sound detection), the device 102 may use the wakeword engine 118 to perform wakeword detection to determine when a user intends to speak a command to the device 102. This process may also be referred to as keyword detection, with the wakeword being a specific example of a keyword. Specifically, keyword detection may be performed without performing linguistic analysis, textual analysis or semantic analysis. Instead, incoming audio (or audio data) may be analyzed to determine if specific characteristics of the audio match preconfigured acoustic waveforms, audio fingerprints, or other data to determine if the incoming audio "matches" stored audio data corresponding to a keyword.

Thus, the wake word engine 118 may compare audio data to stored models 120 or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

As used herein, the wakeword models 120 may be configured to detect the entire wakeword from a user utterance and to detect the first part of the wakeword. By detecting the first part of the wakeword, the wakeword engine 118 may be able to provide an indication of this likely wakeword detection to the routing component 122 of the device 102.

The routing component 122 may be configured to receive the likely wakeword detection indication and send a command to one or more other components of the device 102 to initiate speech processing on the audio data. By initiating speech processing prior to detection of the entire wakeword, the device 102 is more likely to complete the speech processing sooner in time from when the user finishes speaking, decreasing latency in the response time of the device 102. Additionally, the routing component 122 may be configured to refrain from sending the audio data to the speech processing system 132 based at least in part on the detection indication being a likely wakeword detection instead of detection of the entire wakeword. This may prevent the audio data from leaving the device 102 and/or a device associated with the user's environment until the entirety of the wakeword is detected. For example, a given environment may include multiple devices. In this example, the audio data representing the user utterance may be processed on the device that captured the corresponding audio and/or may be processed by another device in the environment, such as a device that includes ASR functionality.

The command from the routing component 122 may be received at the audio processor 124 of the device 102. The audio processor 124 may be configured to perform one or more operations. Those operations may include initiating automatic speech recognition processing 126 on the audio data to determine words corresponding to the user utterance. The operations may also include performing speaker identification tasks, audio signature fingerprinting, wakeword verification, and/or other operations. In examples, the audio processor 124, having initiated automatic speech recognition by the ASR component 126, may determine when the results of the initial processing indicate that one of the words in the user utterance corresponds to the wakeword. For example, when the results include text data, corresponding text of "Alexa, turn on the kitchen light" may include the entire wakeword, here "Alexa." In these examples, the audio processor 124 may generate an indication that the entire wakeword was detected from the results. In other examples, the text data may indicate that the user utterance did not include the entire wakeword, such as when the user says "hey Al, turn on the kitchen light." In these examples, the audio processor 124 may generate an indication that the entire wakeword was not detected from the results.

In addition, and/or alternatively from the audio processor 124 detecting the entire wakeword, the wakeword engine 118 may be configured to detect the entire wakeword. As described above, one or more of the wakeword models 120 may be configured to detect the entire wakeword subsequent to when the first part of the wakeword is detected. In examples, the same wakeword model 120 that is configured to detect the first part of the wakeword may also be configured to detect the entire wakeword. In other examples, a first wakeword model 120 may be configured to detect the first part of the wakeword while a second wakeword model 120 may be configured to detect the entirety of the wakeword. In examples where the entirety of the wakeword is detected, whether by the wakeword engine 118 and/or the audio processor 124, an indication that the entire wakeword has been detected may be sent to the routing component 122. The routing component 122 may then send the audio data representing the user utterance to the speech processing system 132 based at least in part on receiving the indication that the entire wakeword has been detected. Additionally, when the entire wakeword is detected, the device 102 may continue speech processing as described herein. When the entire wakeword is not detected, the wakeword engine 118 and/or the audio processor 124 may send an indication that the entire wakeword was not detected to the routing component 122. The routing component 122 may determine to refrain from sending the audio data to the speech processing system 132 based at least in part on receiving the indication that the entire wakeword was not detected. Additionally, the device 102 may cause the speech processing being performed on the device 102 to be canceled or otherwise prevent further speech processing from being performed based at least in part on the indication that the entire wakeword was not detected.

When the entire wakeword is detected, and/or prior to a determination of whether the entire wakeword is detected, the result generator 128 may continue processing the audio data and/or the text data. The speech processing performed by the result generator 128 may include, for example, additional automatic speech recognition, natural language understanding, entity recognition, and/or command generation from one or more applications residing on the device 102. In instances where the entire wakeword is detected, result data from the result generator 128 may be sent to the system 104 for further processing and/or use for generating a command in response to the user utterance. By so doing, the device 102 may be able to perform at least a portion of the speech processing and provide results thereof to the speech processing system 132 to decrease the processing performed by that speech processing system 132, leading to decreased latency between when the user stops speaking and when the responsive command is performed.

Additionally, the feedback component 130 may be configured to determine when detection thresholds associated with the likely wakeword detection should be adjusted. For example, the wakeword models 120 may be initially trained to detect the likely wakeword using a first threshold. However, over a period of time, feedback data may be collected and/or generated indicating how frequently a likely wakeword detection also corresponded to an entire wakeword detection for the same sample audio data. If the feedback data indicates that the likely wakeword detection is not frequently accompanied by the entire wakeword detection, this data may indicate that the likely wakeword detection threshold should be adjusted to more closely align with the entire wakeword detection. If the feedback data indicates that the likely wakeword detection is always or nearly always accompanied by the entire wakeword detection, this data may indicate that the likely wakeword detection threshold should be relaxed such that more likely wakeword detections occur.

Additionally, while the example of likely wakewords is provided herein, other likely keyword detections from audio data may be performed. For example, some device-directed utterances may not include a wakeword but may include one or more other keywords that indicate the user's intent to cause the device 102 to perform one or more actions. The device 102 may utilize the functionality described herein to detect likely keywords corresponding to first parts of the keywords to determine whether the user is providing a device-directed command without a wakeword and to initiate speech processing as described herein prior to when the device 102 and/or the system 104 detects the entirety of the keyword(s) from the device-directed command.

Additionally, one or more machine learning models may be utilized to identify likely wakewords from audio samples. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with utterances and corresponding wakeword detection indicators. The models may be trained for multiple user accounts and/or for a specific user account. As such, the machine learning models may be configured to learn, without human intervention, attributes of collected utterances and wakeword indications.

It should be noted that while text data is described as a type of data utilized to communicate between various components of the system 104 and/or other systems and/or devices, the components of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102.

As shown in FIG. 1A, several of the components of the system 104 and the associated functionality of those components as described herein may be performed by one or more of the devices 102. Additionally, or alternatively, some or all of the components and/or functionalities associated with the devices 102 may be performed by the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in system 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the system 104 may be local to an environment associated the devices 102. For instance, the system 104 may be located within one or more of the devices 102. In some instances, some or all of the functionality of the system 104 may be performed by one or more of the devices 102. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 1B:
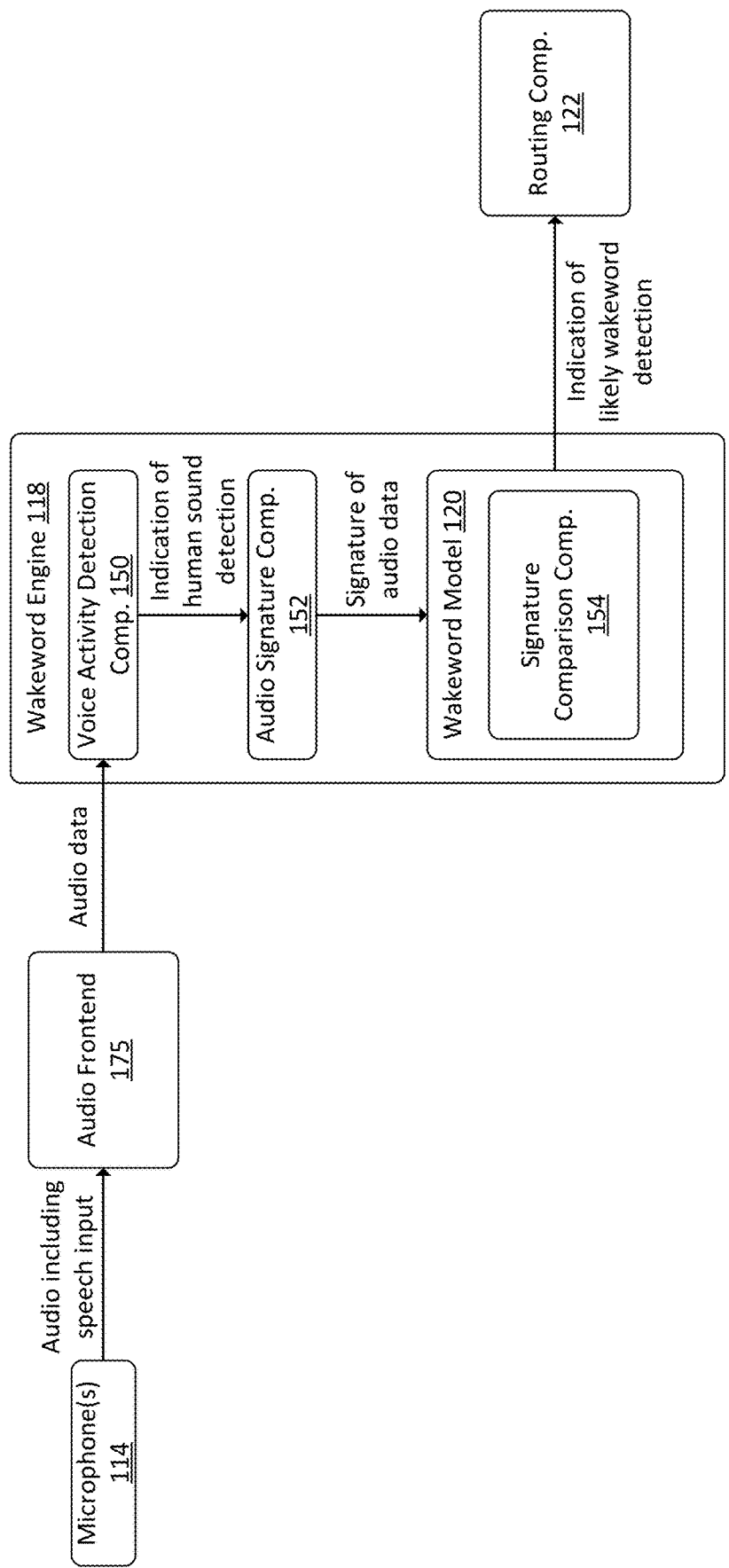
FIG. 1B illustrates example components of a device for preemptive wakeword detection utilizing a single wakeword model.

FIG. 1B illustrates example components of a device 102 for preemptive wakeword detection utilizing a single wakeword model. The components of FIG. 1B may be the same or similar to those of FIG. 1A, including for example the microphone(s) 114, the wakeword engine 118, the wakeword model 120, and the routing component 122. The components of FIG. 1B may also include an audio frontend (AFE) 175, a voice activity detection (VAD) component 150, an audio signature component 152, and/or a signature comparison component 154. The functions of the various components of FIG. 1B will now be described by way of example.

To start, the microphone(s) 114 of the device 102 may receive and capture audio representing sound from within an environment that the device 102 is disposed in. When audio is received at the device 102, the AFE 175 may be configured to perform pre-processing operations on the audio. For example, the AFE 175 may transform the audio data from the microphone into data for processing by the other components of the device 102. The AFE 175 may reduce noise in the audio data and divide the digitized audio data into frames representing time intervals for which the AFE 175 determines a number of values, called features, representing the qualities of the audio data, along with a set of those values, called a feature vector, representing the features/qualities of the audio data within the frame. Many different features may be determined and each feature represents some quality of the audio that may be useful for ASR processing. A number of approaches may be used by the AFE 175 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The AFE 175 may send the audio data to the wakeword engine 118, which may be configured with the one or more wakeword models 120. The wakeword engine 118 may also include the VAD component 150, which may be configured to determine whether given audio data includes human sound. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by device 102 (or separately from human sound detection), the device 102 may use the wake word component 120 to perform wakeword detection to determine when a user intends to speak a command to the device 102. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword. For example, the audio signature component 152 may receive the indication that human sound was detected in the audio data, and may generate an audio signature of the audio data for use by the wakeword model 120. The audio signature may indicate the specific characteristics of the audio, including audio frequencies, amplitudes, phrasing, and/or other characteristics of audio.

The wake word engine 120 may receive the audio signature representing the audio in question from the audio signature component 152 and may compare the audio signature to stored signatures to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN.

Following-on posterior threshold tuning or smoothing is applied for decision making. Other techniques for wakeword detection, such as those known in the art, may also be used.

In the example of FIG. 1B, the signature comparison component 154 of the single wakeword model 120 may be configured to compare the audio signature with both a stored signature for a likely wakeword detection and also a stored signature for a normal or otherwise complete wakeword detection. By so doing, the wakeword models 120 may be configured to analyze audio data representing user utterances to determine if at least a portion of the audio data includes the wakeword. For example, the wakeword model 120 may be configured to detect "Al," and/or "Ale," and/or "Alex" from the audio data. In this example, a stored audio signature for audio including "Al," and/or "Ale," and/or "Alex" may be compared to the sample audio signature to determine if this first part of the wakeword is found in the audio data. By detecting the first part of the wakeword, the wakeword engine 118 may be able to provide an indication of this likely wakeword detection to the routing component 122 of the device 102. Likewise, the wakeword model 120 may compare the audio signature of the sample audio data with the stored audio signature for the entire wakeword, for example "Alexa," to determine if the audio data at issue includes the entire wakeword.

In examples where the signature comparison component 154 of the wakeword model determines that the first part of the wakeword is detected, the wakeword model 120 may send an indication of this detection to the routing component 122. In examples where the signature comparison component 154 of the wakeword model determines, subsequent to when the first part of the wakeword is detected, that the entire wakeword is detected, the wakeword model 120 may send an indication of this detection to the routing component 122.

Figure 1C:
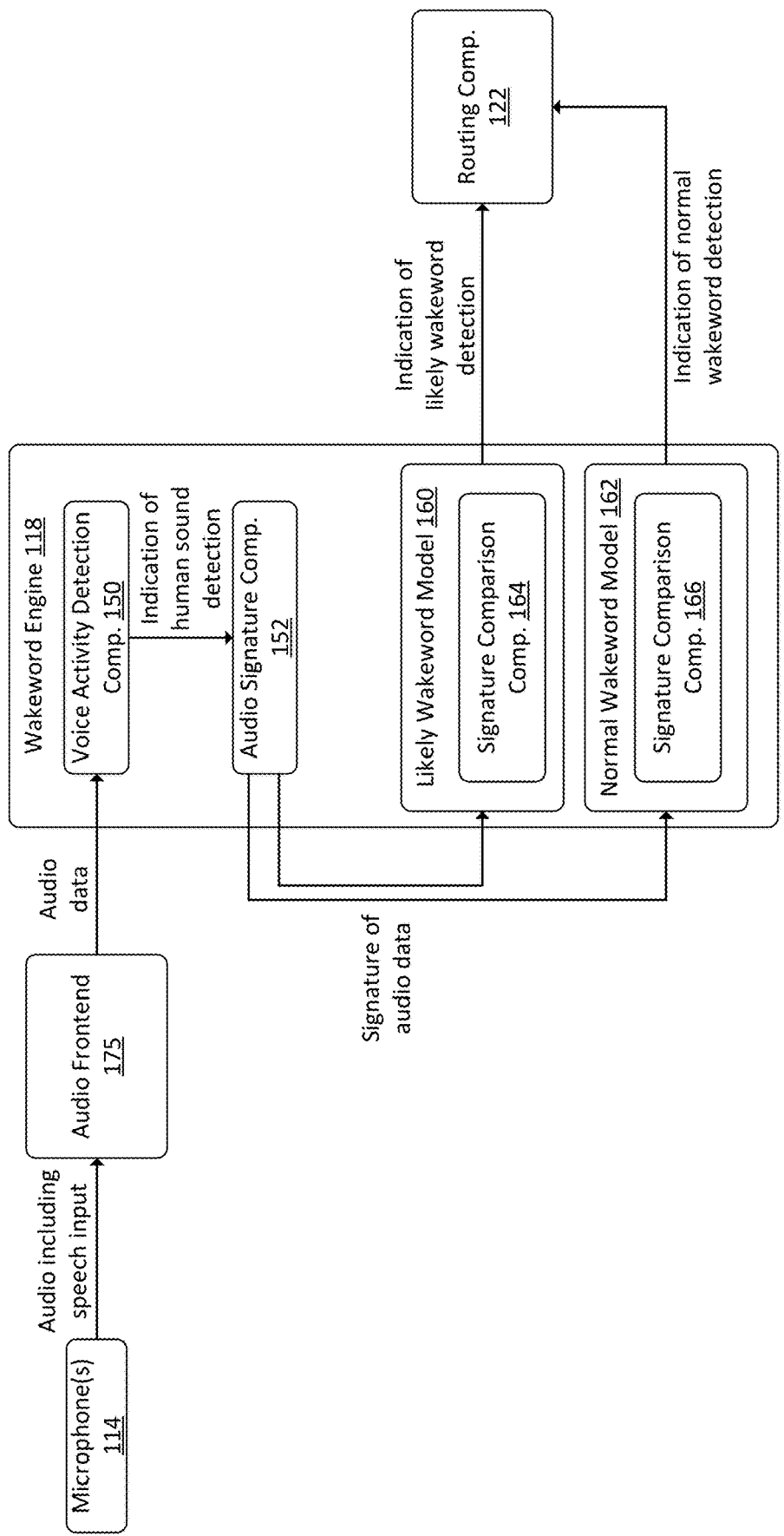
FIG. 1C illustrates example components of a device for preemptive wakeword detection utilizing multiple wakeword models.

FIG. 1C illustrates example components of a device 102 for preemptive wakeword detection utilizing multiple wakeword models. The components of FIG. 1C may be the same or similar to those of FIG. 1A, including for example the microphone(s) 114, the wakeword engine 118, the wakeword model 120, and the routing component 122. The components of FIG. 1C may also include the AFE 175, the VAD component 150, and/or the audio signature component 152. The functions of the various components of FIG. 1C will now be described by way of example.

To start, the microphone(s) 114 of the device 102 may receive and capture audio representing sound from within an environment that the device 102 is disposed in. When audio is received at the device 102, the AFE 175 may be configured to perform pre-processing operations on the audio. For example, the AFE 175 may transform the audio data from the microphone into data for processing by the other components of the device 102. The AFE 175 may reduce noise in the audio data and divide the digitized audio data into frames representing time intervals for which the AFE 175 determines a number of values, called features, representing the qualities of the audio data, along with a set of those values, called a feature vector, representing the features/qualities of the audio data within the frame. Many different features may be determined and each feature represents some quality of the audio that may be useful for ASR processing. A number of approaches may be used by the AFE 175 to process the audio data, such as MFCCs, PLP techniques, neural network feature vector techniques, linear discriminant analysis, semi-tied covariance matrices, or other approaches known to those of skill in the art.

The AFE 175 may send the audio data to the wakeword engine 118, which may be configured with the one or more wakeword models 120. The wakeword engine 118 may also include the VAD component 150, which may be configured to determine whether given audio data includes human sound. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, HMM or GMM techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by device 102 (or separately from human sound detection), the device 102 may use the wake word models 160, 162 to perform wakeword detection to determine when a user intends to speak a command to the device 102. The wakeword models 160, 162 may be similar to the wakeword model 120 as described with respect to FIG. 1A, with the wakeword model 160 being configured to detect the likely wakeword and the wakeword model 162 being configured to detect the normal wakeword. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword. For example, the audio signature component 152 may receive the indication that human sound was detected in the audio data, and may generate an audio signature of the audio data for use by the wakeword models 160, 162 The audio signature may indicate the specific characteristics of the audio, including audio frequencies, amplitudes, phrasing, and/or other characteristics of audio.

The first wake word engine 160 may receive the audio signature representing the audio in question from the audio signature component 152 and may compare the audio signature to stored signatures to detect a wakeword. One approach for wakeword detection applies general LVCSR systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on DNN/RNN structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

In the example of FIG. 1C, the signature comparison component 164 of the first wakeword model 160 may be configured to compare the audio signature with a stored signature for a likely wakeword detection. By so doing, the first wakeword models 160 may be configured to analyze audio data representing user utterances to determine if at least a portion of the audio data includes the first part of the wakeword. For example, the wakeword model 160 may be configured to detect "Al," and/or "Ale," and/or "Alex" from the audio data. In this example, a stored audio signature for audio including "Al," and/or "Ale," and/or "Alex" may be compared to the sample audio signature to determine if this first part of the wakeword is found in the audio data. By detecting the first part of the wakeword, the wakeword engine 118 may be able to provide an indication of this likely wakeword detection to the routing component 122 of the device 102.

Additionally, the signature comparison component 166 of the second wakeword model 162 may be configured to compare the audio signature with a stored signature for a complete wakeword detection. By so doing, the second wakeword models 162 may be configured to analyze audio data representing user utterances to determine if at least a portion of the audio data includes the entire wakeword. For example, the second wakeword model 162 may compare the audio signature of the sample audio data with the stored audio signature for the entire wakeword, for example "Alexa," to determine if the audio data at issue includes the entire wakeword.

In examples where the signature comparison component 164 of the first wakeword model 160 determines that the first part of the wakeword is detected, the first wakeword model 160 may send an indication of this detection to the routing component 122. In examples where the signature comparison component 166 of the second wakeword model 162 determines, subsequent to when the first part of the wakeword is detected, that the entire wakeword is detected, the second wakeword model 162 may send an indication of this detection to the routing component 122.

FIG. 2A illustrates a conceptual diagram of example components for preemptive wakeword detection. The components may include some or all of the components described with respect to FIG. 1A, such as a wakeword engine 118 having one or more wakeword models 120, a routing component 122, an audio processor 124 having an ASR component 126, a result generator 128, and/or a system 104. The components may also include an audio frontend (AFE) 175, a wakeword verifier 204, an ASR processor 206, an NLU component 208, an entity recognition component 210, an orchestrator 212, and a hybrid engine 214. Example functionality of the various components of FIG. 2A is provided below.

For example, when audio is received at a device, the AFE 175 may be configured to perform pre-processing operations on the audio. For example, the AFE 175 may transform the audio data from the microphone into data for processing by the other components of the device 102. The AFE 175 may reduce noise in the audio data and divide the digitized audio data into frames representing time intervals for which the AFE 175 determines a number of values, called features, representing the qualities of the audio data, along with a set of those values, called a feature vector, representing the features/qualities of the audio data within the frame. Many different features may be determined and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The AFE 175 may send the audio data to the wakeword engine 118, which may be configured with the one or more wakeword models 120. The wakeword models 120 may be configured to analyze audio data representing user utterances to determine if at least a portion of the audio data includes the wakeword. Additionally, at least one of the wakeword models 120 may be configured to analyze the audio data to determine if a first part of the wakeword has been spoken. For example, the wakeword model 120 may be configured to detect "Al," and/or "Ale," and/or "Alex" from the audio data. As used herein, the wakeword models 120 may be configured to detect the entire wakeword from a user utterance and to detect the first part of the wakeword. By detecting the first part of the wakeword, the wakeword engine 118 may be able to provide an indication of this likely wakeword detection to the routing component 122 of the device 102.

The routing component 122 may be configured to receive the likely wakeword detection indication and send a command to one or more other components of the device 102 to initiate speech processing on the audio data. By initiating speech processing prior to detection of the entire wakeword, the device 102 is more likely to complete the speech processing sooner in time from when the user finishes speaking, decreasing latency in the response time of the device 102. Additionally, the routing component 122 may be configured to refrain from sending the audio data to the system 104 based at least in part on the detection indication being a likely wakeword detection instead of detection of the entire wakeword. This may prevent the audio data from leaving the device 102 and/or a device associated with the user's environment until the entirety of the wakeword is detected. For example, a given environment may include multiple devices. In this example, the audio data representing the user utterance may be processed on the device that captured the corresponding audio and/or may be processed by another device in the environment, such as a device that includes ASR functionality.

The command from the routing component 122 may be received at the audio processor 124 of the device 102. The audio processor 124 may be configured to perform one or more operations. Those operations may include initiating automatic speech recognition processing on the audio data to determine words corresponding to the user utterance. The operations may also include performing speaker identification tasks, audio signature fingerprinting, wakeword verification, and/or other operations. The orchestrator 212 may be configured to receive the command from the routing component 122 along with the sample audio data and may be configured to request the components of the audio processor 124 to perform operations. In examples, the audio processor 124, having initiated automatic speech recognition by the ASR component 126, may determine when the results of the initial processing indicate that one of the words in the user utterance corresponds to the wakeword. For example, when the results include text data, corresponding text of "Alexa, turn on the kitchen light" may include the entire wakeword, here "Alexa." The wakeword verifier 204 may be configured to receive the text data from the ASR component 126 and to determine if one or more words represented in the text data corresponds to the wakeword. In these examples, the audio processor 124 may generate an indication that the entire wakeword was detected from the results. In other examples, the text data may indicate that the user utterance did not include the entire wakeword, such as when the user says "hey Al, turn on the kitchen light." In these examples, the audio processor 124 may generate an indication that the entire wakeword was not detected from the results.

In addition, and/or alternatively from the audio processor 124 detecting the entire wakeword, the wakeword engine 118 may be configured to detect the entire wakeword. As described above, one or more of the wakeword models 120 may be configured to detect the entire wakeword subsequent to when the first part of the wakeword is detected. In examples, the same wakeword model 120 that is configured to detect the first part of the wakeword may also be configured to detect the entire wakeword. In other examples, a first wakeword model 120 may be configured to detect the first part of the wakeword while a second wakeword model 120 may be configured to detect the entirety of the wakeword. In examples where the entirety of the wakeword is detected, whether by the wakeword engine 118 and/or the audio processor 124, an indication that the entire wakeword has been detected may be sent to the routing component 122. The routing component 122 may then send the audio data representing the user utterance to the system 104 based at least in part on receiving the indication that the entire wakeword has been detected. Additionally, when the entire wakeword is detected, the device 102 may continue speech processing as described herein. When the entire wakeword is not detected, the wakeword engine 118 and/or the audio processor 124 may send an indication that the entire wakeword was not detected to the routing component 122. The routing component 122 may determine to refrain from sending the audio data to the system 104 based at least in part on receiving the indication that the entire wakeword was not detected. Additionally, the device 102 may cause the speech processing being performed on the device 102 to be canceled or otherwise prevent further speech processing from being performed based at least in part on the indication that the entire wakeword was not detected.

When the entire wakeword is detected, and/or prior to a determination of whether the entire wakeword is detected, the result generator 128 may continue processing the audio data and/or the text data. The speech processing performed by the result generator 128 may include, for example, additional ASR performed by an ASR processor 206, natural language understanding performed by the NLU component 208, entity recognition performed by the entity recognition component 210, and/or command generation from one or more applications residing on the device 102. In instances where the entire wakeword is detected, result data from the result generator 128 may be sent to the system 104 for further processing and/or use for generating a command in response to the user utterance. By so doing, the device 102 may be able to perform at least a portion of the speech processing and provide results thereof to the system 104 to decrease the processing performed by that the system 104, leading to decreased latency between when the user stops speaking and when the responsive command is performed.

Figure 2B:
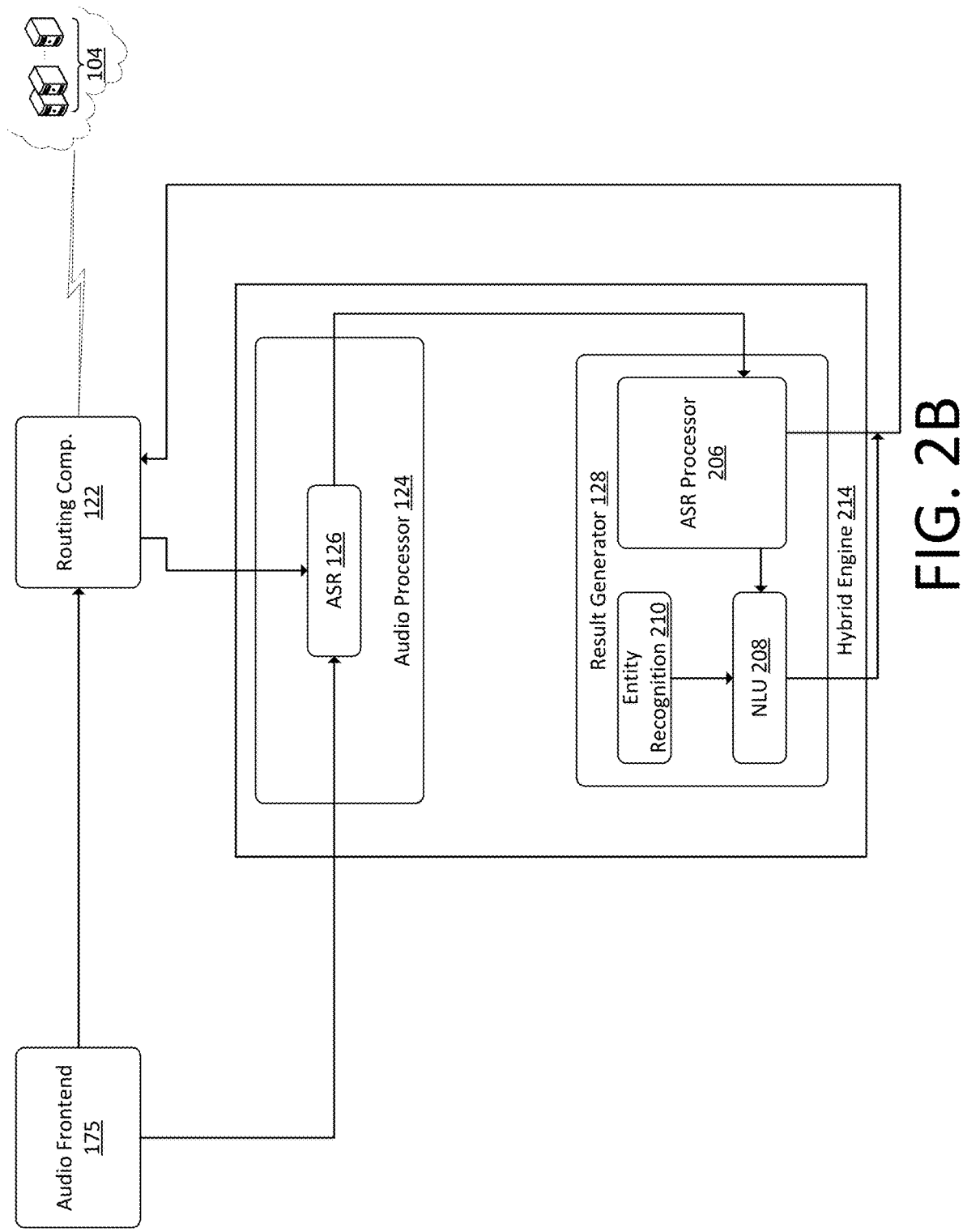
FIG. 2B illustrates a conceptual diagram of example components for preemptive wakeword detection utilizing an audio frontend.

FIG. 2B illustrates a conceptual diagram of example components for preemptive wakeword detection utilizing an audio frontend. The components of FIG. 2B may be the same or similar to those described with respect to FIG. 2A. For example, the components of FIG. 2B may include the audio frontend 175, the routing component 122, the audio processor 124, the ASR component 126, the result generator 128, the ASR processor 206, the NLU component 208, the entity recognition component 210, the hybrid engine 214, and the speech processing system 104. In the embodiment of FIG. 2B, instead or, or in addition to, wakeword models detecting the likely wakeword and the normal wakeword, the AFE may perform operations associated with at least detecting the likely wakeword.

For example, when audio is received at a device, the AFE 175 may be configured to perform pre-processing operations on the audio. For example, the AFE 175 may transform the audio data from the microphone into data for processing by the other components of the device 102. The AFE 175 may reduce noise in the audio data and divide the digitized audio data into frames representing time intervals for which the AFE 175 determines a number of values, called features, representing the qualities of the audio data, along with a set of those values, called a feature vector, representing the features/qualities of the audio data within the frame. Many different features may be determined and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

In examples, the AFE 175 may include a voice activity detection (VAD) component, which may be configured to determine whether given audio data includes human sound. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Utilizing the features generated above along with the VAD analysis, the AFE 175 may compare the features and VAD analysis results with stored features and/or results indicative of at least the first part of the wakeword to determine whether the audio data includes the likely wakeword. In examples where the AFE 175 determines that the audio data includes the likely wakeword, the AFE 175 may send an indication of likely wakeword detection to the routing component 122 and/or may send the audio data to the hybrid engine 214.

The routing component 122 may be configured to receive the likely wakeword detection indication and send a command to one or more other components of the device 102 to initiate speech processing on the audio data. By initiating speech processing prior to detection of the entire wakeword, the device 102 is more likely to complete the speech processing sooner in time from when the user finishes speaking, decreasing latency in the response time of the device 102. Additionally, the routing component 122 may be configured to refrain from sending the audio data to the system 104 based at least in part on the detection indication being a likely wakeword detection instead of detection of the entire wakeword. This may prevent the audio data from leaving the device 102 and/or a device associated with the user's environment until the entirety of the wakeword is detected. For example, a given environment may include multiple devices. In this example, the audio data representing the user utterance may be processed on the device that captured the corresponding audio and/or may be processed by another device in the environment, such as a device that includes ASR functionality.

The command from the routing component 122 may be received at the audio processor 124 of the device 102. The audio processor 124 may be configured to perform one or more operations. Those operations may include initiating automatic speech recognition processing on the audio data to determine words corresponding to the user utterance. The operations may also include performing speaker identification tasks, audio signature fingerprinting, wakeword verification, and/or other operations. In examples, the audio processor 124, having initiated automatic speech recognition by the ASR component 126, may determine when the results of the initial processing indicate that one of the words in the user utterance corresponds to the wakeword. For example, when the results include text data, corresponding text of "Alexa, turn on the kitchen light" may include the entire wakeword, here "Alexa."

In examples where the entirety of the wakeword is detected, an indication that the entire wakeword has been detected may be sent to the routing component 122. The routing component 122 may then send the audio data representing the user utterance to the system 104 based at least in part on receiving the indication that the entire wakeword has been detected. Additionally, when the entire wakeword is detected, the device 102 may continue speech processing as described herein. When the entire wakeword is not detected, an indication that the entire wakeword was not detected may be sent to the routing component 122. The routing component 122 may determine to refrain from sending the audio data to the system 104 based at least in part on receiving the indication that the entire wakeword was not detected. Additionally, the device 102 may cause the speech processing being performed on the device 102 to be canceled or otherwise prevent further speech processing from being performed based at least in part on the indication that the entire wakeword was not detected.

When the entire wakeword is detected, and/or prior to a determination of whether the entire wakeword is detected, the result generator 128 may continue processing the audio data and/or the text data. The speech processing performed by the result generator 128 may include, for example, additional ASR performed by an ASR processor 206, natural language understanding performed by the NLU component 208, entity recognition performed by the entity recognition component 210, and/or command generation from one or more applications residing on the device 102. In instances where the entire wakeword is detected, result data from the result generator 128 may be sent to the system 104 for further processing and/or use for generating a command in response to the user utterance. By so doing, the device 102 may be able to perform at least a portion of the speech processing and provide results thereof to the system 104 to decrease the processing performed by that the system 104, leading to decreased latency between when the user stops speaking and when the responsive command is performed.

Figure 2C:
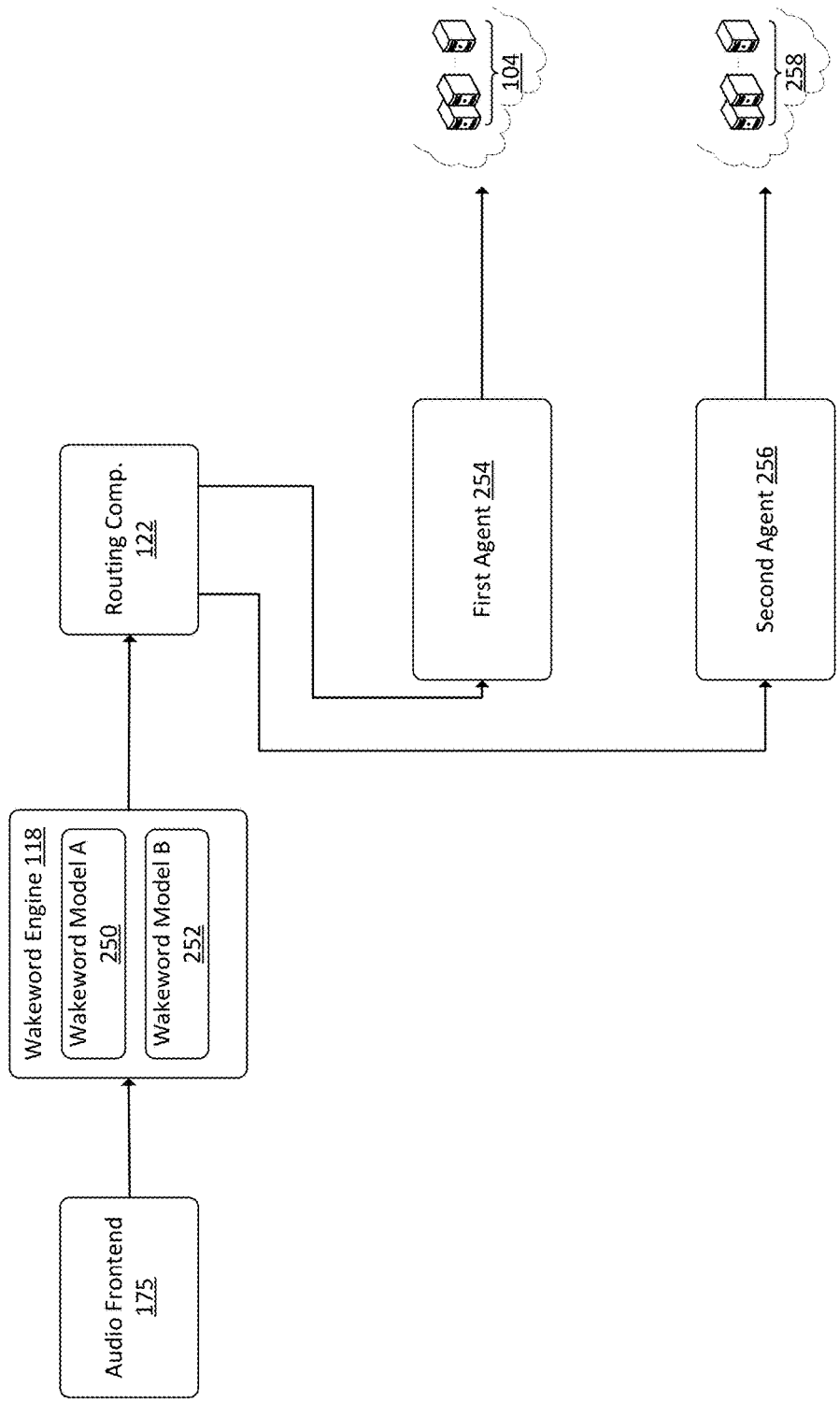
FIG. 2C illustrates a conceptual diagram of example components for preemptive wakeword detection in a multi-assistant system.

FIG. 2C illustrates a conceptual diagram of example components for preemptive wakeword detection in a multi-assistant system. The components of FIG. 2C may be the same or similar to those described with respect to FIG. 2A. For example, the components of FIG. 2C may include the audio frontend 175, the routing component 122, the audio processor 124, the ASR component 126, the result generator 128, the ASR processor 206, the NLU component 208, the entity recognition component 210, the hybrid engine 214, and the speech processing system 104. In the embodiment of FIG. 2C, the device and/or system at issue may be configured to detect multiple wakewords, with each and/or some of the wakewords being associated with their own speech processing system and/or assistant.

For example, when audio is received at a device, the AFE 175 may be configured to perform pre-processing operations on the audio. For example, the AFE 175 may transform the audio data from the microphone into data for processing by the other components of the device 102. The AFE 175 may reduce noise in the audio data and divide the digitized audio data into frames representing time intervals for which the AFE 175 determines a number of values, called features, representing the qualities of the audio data, along with a set of those values, called a feature vector, representing the features/qualities of the audio data within the frame. Many different features may be determined and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The AFE 175 may send the audio data to the wakeword engine 118, which may be configured with the one or more wakeword models 120. The wakeword models 120 may be configured to analyze audio data representing user utterances to determine if at least a portion of the audio data includes the wakeword. Additionally, at least one of the wakeword models 120 may be configured to analyze the audio data to determine if a first part of the wakeword has been spoken. For example, the wakeword model 120 may be configured to detect "Al," and/or "Ale," and/or "Alex" from the audio data. As used herein, the wakeword models 120 may be configured to detect the entire wakeword from a user utterance and to detect the first part of the wakeword. By detecting the first part of the wakeword, the wakeword engine 118 may be able to provide an indication of this likely wakeword detection to the routing component 122 of the device 102.

In the example of FIG. 2C, the device 102 is configured to detect multiple wakewords, with each of the wakewords being associated with their own speech processing system. For example, Wakeword Model A 250 may be configured to detect a first wakeword and/or a first part of the first wakeword. Wakeword Model B 252 may be configured to detect a second wakeword and/or a first part of the second wakeword. Wakeword Model A 250 and Wakeword Model B 252 may be configured to perform the same or similar operations as described herein with respect to the wakeword model(s) 120.

The routing component 122 may be configured to receive the likely wakeword detection indication and send a command to one or more other components of the device 102 to initiate speech processing on the audio data. For example, the routing component 122 may be configured to receive the wakeword detection indications from Wakeword Model A 250, and based at least in part on the indications being received from Wakeword Model A 250, the routing component 122 may be configured to send commands to components of the device 102 associated with Wakeword Model A 250, such as the first agent 254. Likewise, when the indications are received from Wakeword Model B 252, the routing component 122 may be configured to send commands to components of the device 102 associated with Wakeword Model B 252, such as the second agent 256.

The first agent 254 and/or the second agent 256 may be configured to initiate speech processing based at least in part on a likely wakeword detection for the wakeword associated with the respective agents. By initiating speech processing prior to detection of the entire wakeword, the device 102 is more likely to complete the speech processing sooner in time from when the user finishes speaking, decreasing latency in the response time of the device 102. Additionally, the routing component 122 may be configured to refrain from sending the audio data to the system 104 associated with the first agent 254 and/or the system 258 associated with the second agent 256 based at least in part on the detection indication being a likely wakeword detection instead of detection of the entire wakeword. This may prevent the audio data from leaving the device 102 and/or a device associated with the user's environment until the entirety of the wakeword is detected. For example, a given environment may include multiple devices. In this example, the audio data representing the user utterance may be processed on the device that captured the corresponding audio and/or may be processed by another device in the environment, such as a device that includes ASR functionality.

In examples where the entirety of the wakeword is detected, an indication that the entire wakeword has been detected may be sent to the routing component 122, which may communicate with the first agent 254 and/or the second agent 256 depending on the wakeword that was detected. When the first agent 254 is utilized, the first agent 254 may send the audio data representing the user utterance to the system 104 based at least in part on receiving the indication that the entire wakeword has been detected. Additionally, when the entire wakeword is detected, the device 102 may continue speech processing as described herein. When the second agent 256 is utilized, the second agent 256 may send the audio data representing the user utterance to the system 258 based at least in part on receiving the indication that the entire wakeword has been detected. Additionally, when the entire wakeword is detected, the device 102 may continued speech processing as described herein.

Figure 3:
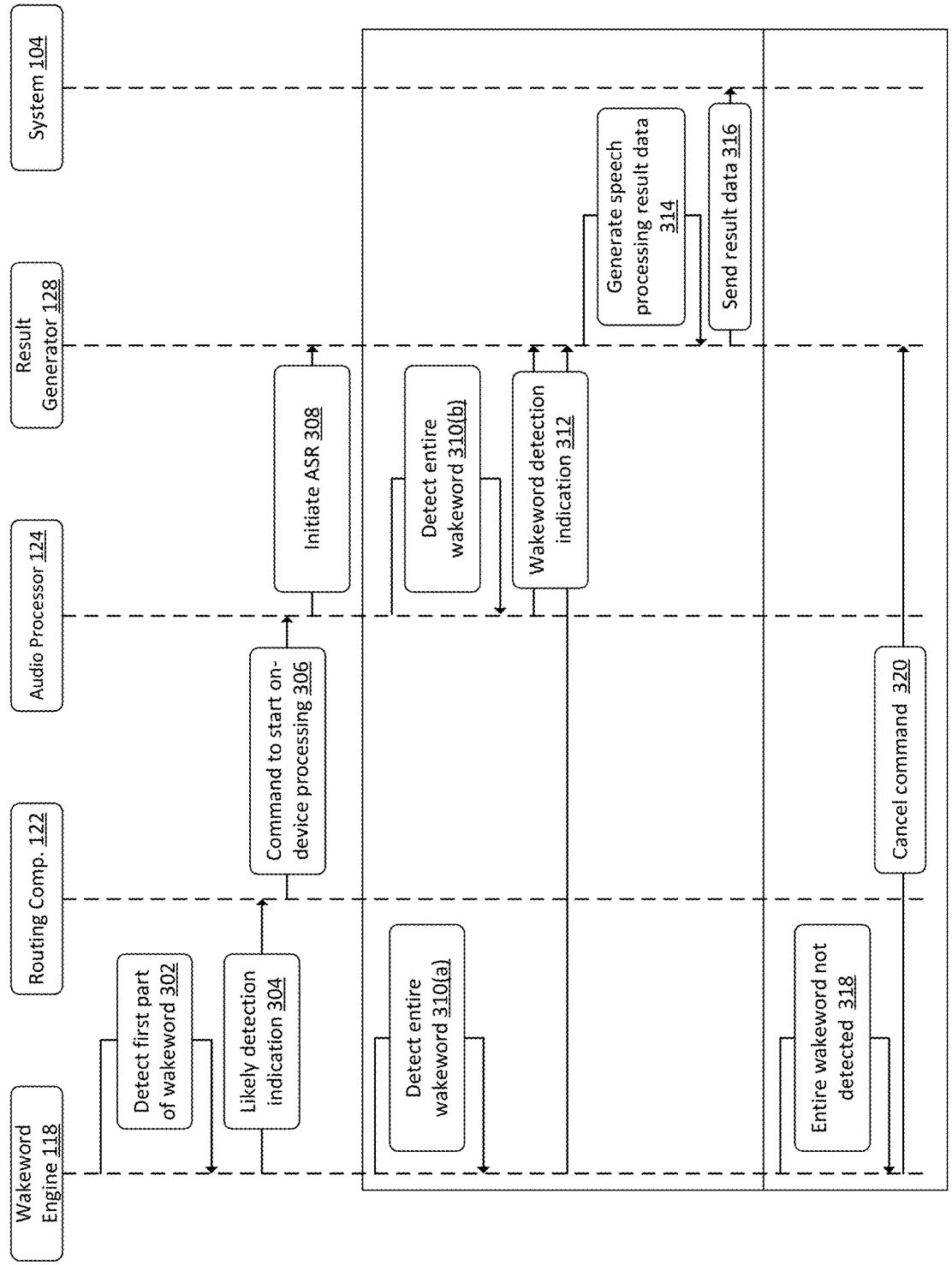
FIG. 3 illustrates a sequence diagram of an example process for preemptive wakeword detection where on-device speech processing results data is sent to a system when an entirety of a wakeword is detected.

FIG. 3 illustrates a sequence diagram of an example process for preemptive wakeword detection where on-device speech processing results data is sent to a system when an entirety of a wakeword is detected. It should be understood that the example processes described in FIG. 3 are provided in an illustrative order, but that the processes may be performed in other orders and/or in parallel.

At block 302, the wakeword engine 118 may detect a first part of a wakeword. For example, the wakeword model 120 may be configured to detect "Al," and/or "Ale," and/or "Alex" from the audio data. For example, the wake word engine 118 works in conjunction with other components of the device 102, for example the microphone 114 to detect keywords in audio data. For example, the device may convert audio into audio data, and process the audio data with the wake word engine 118 to determine whether human sound is detected, and if so, if the audio data comprising human sound matches an audio fingerprint and/or model corresponding to a particular keyword.

The device 102 may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 102 may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by device 102 (or separately from human sound detection), the device 102 may use the wakeword engine 118 to perform wakeword detection to determine when a user intends to speak a command to the device 102. This process may also be referred to as keyword detection, with the wakeword being a specific example of a keyword. Specifically, keyword detection may be performed without performing linguistic analysis, textual analysis or semantic analysis. Instead, incoming audio (or audio data) may be analyzed to determine if specific characteristics of the audio match preconfigured acoustic waveforms, audio fingerprints, or other data to determine if the incoming audio "matches" stored audio data corresponding to a keyword.

Thus, the wake word engine 118 may compare audio data to stored models 120 or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

At block 304, the wakeword engine 118 may send an indication of a likely wakeword detection to a routing component 122. For example, the indication may include data that indicates to the routing component 122 that the wakeword model 120 designed to detect the wakeword has detected a first part of the wakeword and/or that a wakeword model 120 designed to detect just the first part of the wakeword has detected the first part of the wakeword. In these and other examples, the indication may differentiate between likely wakeword detection and entire wakeword detection.

At block 306, the routing component 122 may send a command to an audio processor 124 to start on-device speech processing of the audio data. The command from the routing component 122 may be received at the audio processor 124 and may indicate that speech processing is to commence conditionally and that an indication of entire wakeword detection and/or that the entire wakeword was not detected is forthcoming.

At block 308, the audio process 124 may initiate automatic speech recognition processing and start sending results of the automatic speech recognition processing to a result generator 128. The audio processor 124 may be configured to perform one or more operations. Those operations may include initiating automatic speech recognition processing 126 on the audio data to determine words corresponding to the user utterance. The operations may also include performing speaker identification tasks, audio signature fingerprinting, wakeword verification, and/or other operations.

At block 310 (*a*), the wakeword engine 118 may detect the entire wakeword from the audio data subsequent to when the wakeword engine 118 detected the first part of the wakeword. For example, the wakeword engine 118 may be configured to detect the entire wakeword. As described above, one or more of the wakeword models 120 may be configured to detect the entire wakeword subsequent to when the first part of the wakeword is detected. In examples, the same wakeword model 120 that is configured to detect the first part of the wakeword may also be configured to detect the entire wakeword. In other examples, a first wakeword model 120 may be configured to detect the first part of the wakeword while a second wakeword model 120 may be configured to detect the entirety of the wakeword.

Additionally, or alternatively, at block 310 (*b*), the audio processor 124 may detect the entire wakeword from the audio data subsequent to when the wakeword engine 118 detected the first part of the wakeword. In this example, the audio processor 124 may utilize the initial automatic speech recognition results to determine that the audio data included a word that corresponds to the wakeword. In examples, the audio processor 124, having initiated automatic speech recognition by the ASR component 126, may determine when the results of the initial processing indicate that one of the words in the user utterance corresponds to the wakeword. For example, when the results include text data, corresponding text of "Alexa, turn on the kitchen light" may include the entire wakeword, here "Alexa." In these examples, the audio processor 124 may generate an indication that the entire wakeword was detected from the results. In other examples, the text data may indicate that the user utterance did not include the entire wakeword, such as when the user says "hey Al, turn on the kitchen light." In these examples, the audio processor 124 may generate an indication that the entire wakeword was not detected from the results.

At block 312, the wakeword engine 118 and/or the audio processor 124 may send a wakeword detection indication to the result generator 128. For example, when the entirety of the wakeword is detected, whether by the wakeword engine 118 and/or the audio processor 124, an indication that the entire wakeword has been detected may be sent to the routing component 122.

At block 314, the result generator 128 may continue to perform speech processing on the audio data and/or the ASR result data to generate speech processing result data. This operation is performed in light of the entire wakeword being detected by the device. When the entire wakeword is detected, and/or prior to a determination of whether the entire wakeword is detected, the result generator 128 may continue processing the audio data and/or the text data. The speech processing performed by the result generator 128 may include, for example, additional automatic speech recognition, natural language understanding, entity recognition, and/or command generation from one or more applications residing on the device 102. In instances where the entire wakeword is detected, result data from the result generator 128 may be sent to the system 104 for further processing and/or use for generating a command in response to the user utterance. By so doing, the device 102 may be able to perform at least a portion of the speech processing and provide results thereof to the system 104 to decrease the processing performed by that the system 104, leading to decreased latency between when the user stops speaking and when the responsive command is performed.

At block 316, the result generator 128 may send the result data to the system 104. In examples, the result generator 128 routes the result data to the routing component 122, which sends the result data to the system 104 based at least in part on the entire wakeword being detected. For example, the routing component 122 may send the audio data representing the user utterance to the speech processing system 132 based at least in part on receiving the indication that the entire wakeword has been detected. Additionally, when the entire wakeword is detected, the device 102 may continue speech processing as described herein.

At block 318, instead of the operations of blocks 310 (*a*) to 316 being performed, the wakeword engine 118 and/or one or more other components of the device may determine that the entire wakeword is not detected from the audio data.

In these examples, at block 320, the wakeword engine 118 and/or the one or more other components may send a cancel command to the routing component 122, the audio processor 124, and/or the result generator 128. The cancel command may cause the speech processing being performed on the audio data to be stopped and may cause the device to refrain from sending the audio data and/or the speech processing result data to the system 104.

Figure 4:
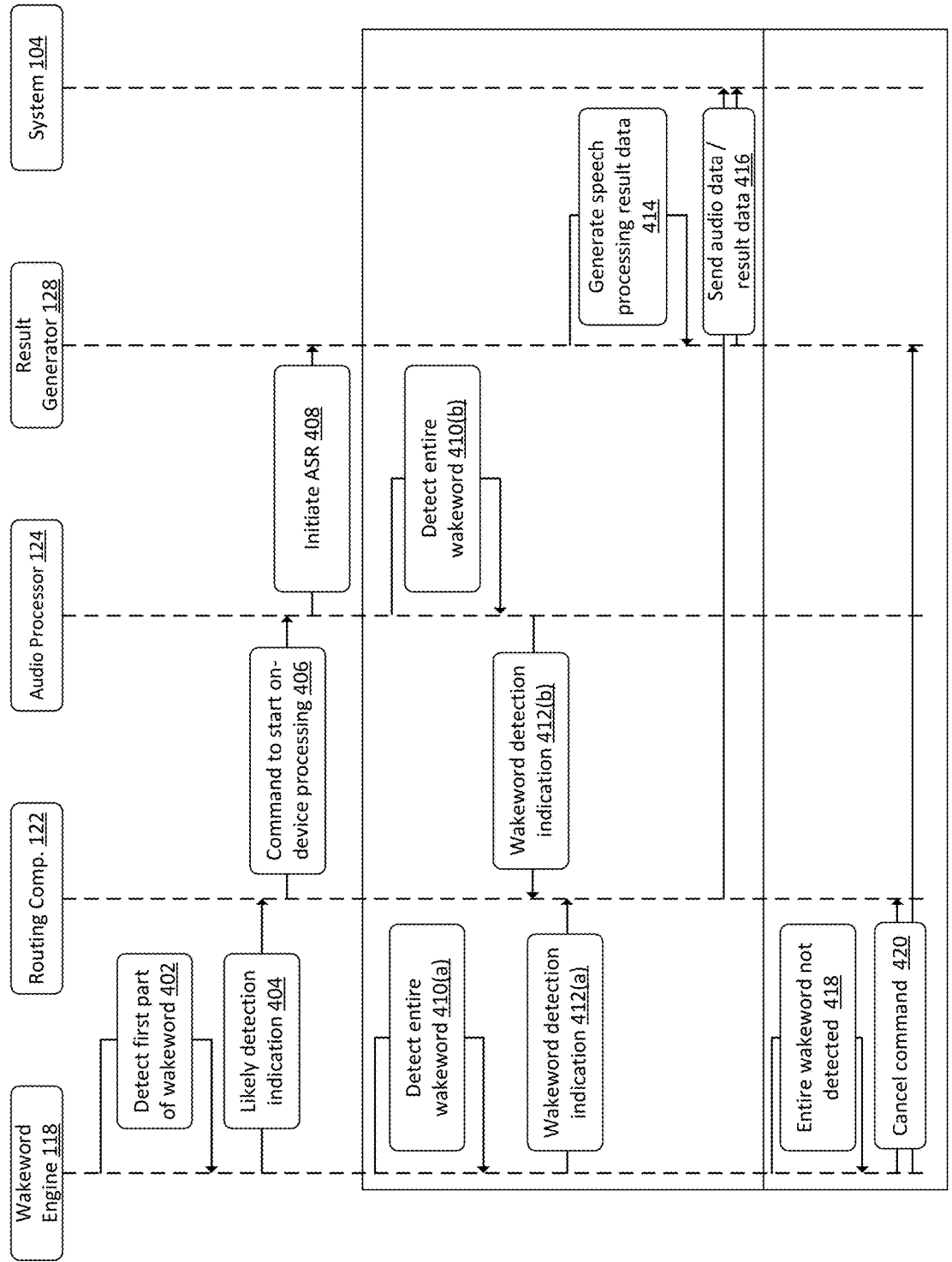
FIG. 4 illustrates a sequence diagram of an example process for preemptive wakeword detection where audio data representing a user utterance is sent to a system for speech processing in addition to on-device speech processing when an entirety of a wakeword is detected.

FIG. 4 illustrates a sequence diagram of an example process for preemptive wakeword detection where audio data representing a user utterance is sent to a system for speech processing in addition to on-device speech processing when an entirety of a wakeword is detected. It should be understood that the example processes described in FIG. 4 are provided in an illustrative order, but that the processes may be performed in other orders and/or in parallel.

At block 402, the wakeword engine 118 may detect a first part of a wakeword. For example, the wakeword model 120 may be configured to detect "Al," and/or "Ale," and/or "Alex" from the audio data.

At block 404, the wakeword engine 118 may send an indication of a likely wakeword detection to a routing component 122. For example, the indication may include data that indicates to the routing component 122 that the wakeword model 120 designed to detect the wakeword has detected a first part of the wakeword and/or that a wakeword model 120 designed to detect just the first part of the wakeword has detected the first part of the wakeword. In these and other examples, the indication may differentiate between likely wakeword detection and entire wakeword detection.

At block 406, the routing component 122 may send a command to an audio processor 124 to start on-device speech processing of the audio data. The command from the routing component 122 may be received at the audio processor 124 and may indicate that speech processing is to commence conditionally and that an indication of entire wakeword detection and/or that the entire wakeword was not detected is forthcoming.

At block 408, the audio processor 124 may initiate automatic speech recognition processing and start sending results of the automatic speech recognition processing to a result generator 128. The audio processor 124 may be configured to perform one or more operations. Those operations may include initiating automatic speech recognition processing 126 on the audio data to determine words corresponding to the user utterance. The operations may also include performing speaker identification tasks, audio signature fingerprinting, wakeword verification, and/or other operations.

At block 410 (a), the wakeword engine 118 may detect the entire wakeword from the audio data subsequent to when the wakeword engine 118 detected the first part of the wakeword. For example, the wakeword engine 118 may be configured to detect the entire wakeword. As described above, one or more of the wakeword models 120 may be configured to detect the entire wakeword subsequent to when the first part of the wakeword is detected. In examples, the same wakeword model 120 that is configured to detect the first part of the wakeword may also be configured to detect the entire wakeword. In other examples, a first wakeword model 120 may be configured to detect the first part of the wakeword while a second wakeword model 120 may be configured to detect the entirety of the wakeword.

Additionally, or alternatively, at block 410 (b), the audio processor 124 may detect the entire wakeword from the audio data subsequent to when the wakeword engine 118 detected the first part of the wakeword. In this example, the audio processor 124 may utilize the initial automatic speech recognition results to determine that the audio data included a word that corresponds to the wakeword.

At block 412 (a), in instances where the wakeword engine 118 detected the entire wakeword, the wakeword engine 118 may send an indication of the wakeword detection to the routing component 122. In this example, the wakeword engine 118 is responsible for determining whether the entire wakeword is detected subsequent to when the likely wakeword detection occurs.

At block 412 (b), in instances where the audio processor 124 detected the entire wakeword, the audio processor 124 may send the indication of the wakeword detection to the routing component 122. In this example, the audio processor 124 is responsible for determining whether the entire wakeword is detected subsequent to when the likely wakeword detection occurs.

At block 414, the result generator 128 may continue to perform speech processing on the audio data and/or the ASR result data to generate speech processing result data. This operation is performed in light of the entire wakeword being detected by the device. When the entire wakeword is detected, and/or prior to a determination of whether the entire wakeword is detected, the result generator 128 may continue processing the audio data and/or the text data.

The speech processing performed by the result generator 128 may include, for example, additional automatic speech recognition, natural language understanding, entity recognition, and/or command generation from one or more applications residing on the device 102. In instances where the entire wakeword is detected, result data from the result generator 128 may be sent to the system 104 for further processing and/or use for generating a command in response to the user utterance. By so doing, the device 102 may be able to perform at least a portion of the speech processing and provide results thereof to the system 104 to decrease the processing performed by that the system 104, leading to decreased latency between when the user stops speaking and when the responsive command is performed.

At block 416, the routing component 122, having received the indication that the entire wakeword has been detected, may send the audio data and/or the result data to the system 104. In the example of FIG. 4, the speech processing of the system 104 may be performed at least partially concurrently with the speech processing performed by the result generator 128 from block 414. In examples, the audio data may be sent to the system 104 for processing concurrently with the speech processing performed by the device. For example, the routing component 122 may send the audio data representing the user utterance to the speech processing system 132 based at least in part on receiving the indication that the entire wakeword has been detected. Additionally, when the entire wakeword is detected, the device 102 may continue speech processing as described herein.

At block 418, instead of the operations of blocks 410 (a) to 416 being performed, the wakeword engine 118 and/or one or more other components of the device may determine that the entire wakeword is not detected from the audio data.

In these examples, at block 420, the wakeword engine 118 and/or the one or more other components may send a cancel command to the routing component 122, the audio processor 124, and/or the result generator 128. The cancel command may cause the speech processing being performed on the audio data to be stopped and may cause the device to refrain from sending the audio data and/or the speech processing result data to the system 104.

Figure 5:
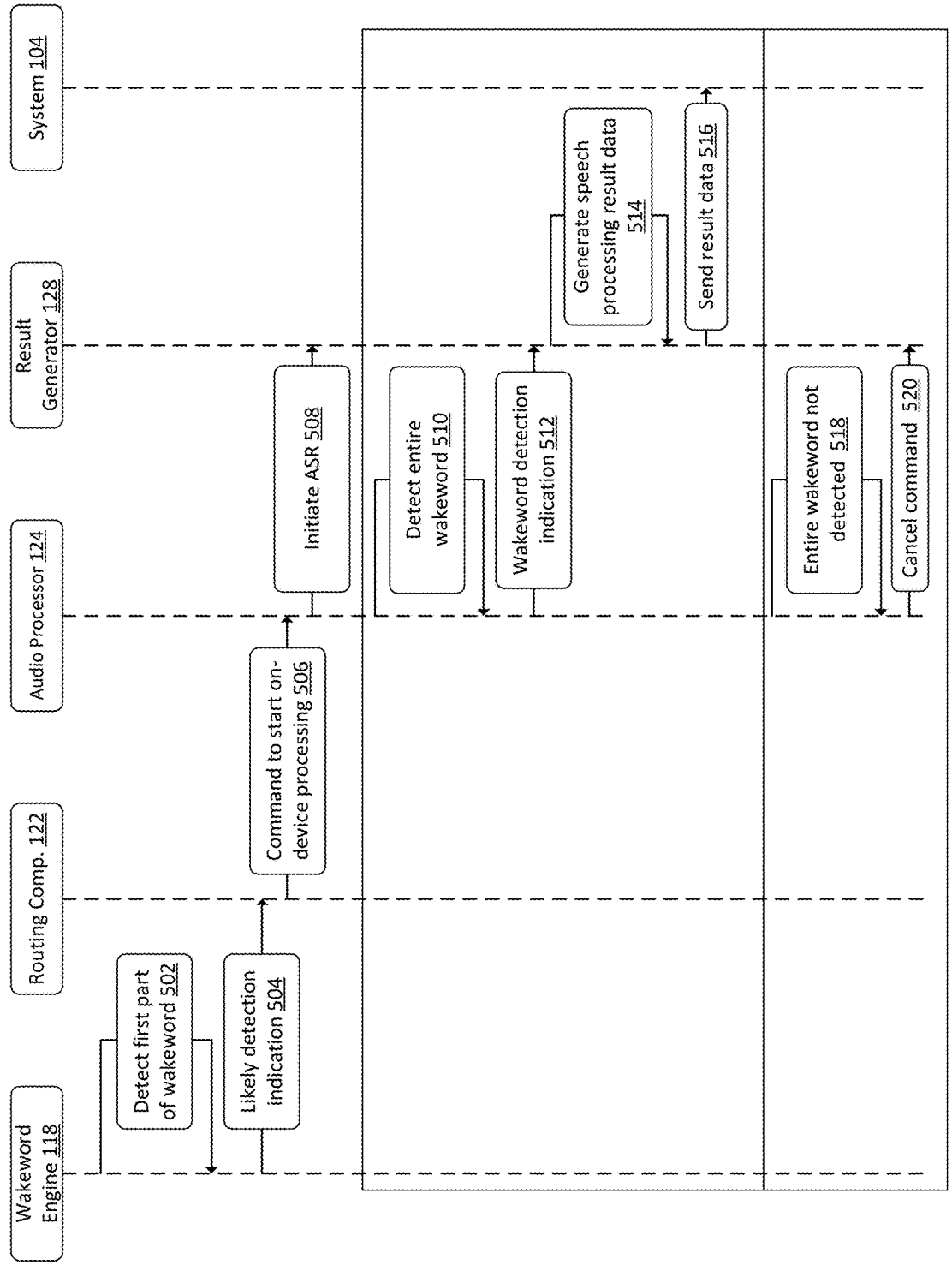
FIG. 5 illustrates a sequence diagram of an example process for preemptive wakeword detection where the entirety of the wakeword is detected from automatic speech recognition results.

FIG. 5 illustrates a sequence diagram of an example process for preemptive wakeword detection where the entirety of the wakeword is detected from automatic speech recognition results. It should be understood that the example processes described in FIG. 5 are provided in an illustrative order, but that the processes may be performed in other orders and/or in parallel.

At block 502, the wakeword engine 118 may detect a first part of a wakeword. For example, the wakeword model 120 may be configured to detect "Al," and/or "Ale," and/or "Alex" from the audio data.

At block 504, the wakeword engine 118 may send an indication of a likely wakeword detection to a routing component 122. For example, the indication may include data that indicates to the routing component 122 that the wakeword model 120 designed to detect the wakeword has detected a first part of the wakeword and/or that a wakeword model 120 designed to detect just the first part of the wakeword has detected the first part of the wakeword. In these and other examples, the indication may differentiate between likely wakeword detection and entire wakeword detection.

At block 506, the routing component 122 may send a command to an audio processor 124 to start on-device speech processing of the audio data. The command from the routing component 122 may be received at the audio processor 124 and may indicate that speech processing is to commence conditionally and that an indication of entire wakeword detection and/or that the entire wakeword was not detected is forthcoming.

At block 508, the audio process 124 may initiate automatic speech recognition processing and start sending results of the automatic speech recognition processing to a result generator 128. The audio processor 124 may be configured to perform one or more operations. Those operations may include initiating automatic speech recognition processing 126 on the audio data to determine words corresponding to the user utterance. The operations may also include performing speaker identification tasks, audio signature fingerprinting, wakeword verification, and/or other operations.

At block 510, the audio processor 124 may detect the entire wakeword from the audio data subsequent to when the wakeword engine 118 detected the first part of the wakeword. In this example, the audio processor 124 may utilize the initial automatic speech recognition results to determine that the audio data included a word that corresponds to the wakeword. For example, the wakeword engine 118 may be configured to detect the entire wakeword. As described above, one or more of the wakeword models 120 may be configured to detect the entire wakeword subsequent to when the first part of the wakeword is detected. In examples, the same wakeword model 120 that is configured to detect the first part of the wakeword may also be configured to detect the entire wakeword. In other examples, a first wakeword model 120 may be configured to detect the first part of the wakeword while a second wakeword model 120 may be configured to detect the entirety of the wakeword.

At block 512, in instances where the audio processor 124 detected the entire wakeword, the audio processor 124 may send the indication of the wakeword detection to the result generator 128.

At block 514, the result generator 128 may continue to perform speech processing on the audio data and/or the ASR result data to generate speech processing result data. This operation is performed in light of the entire wakeword being detected by the device. When the entire wakeword is detected, and/or prior to a determination of whether the entire wakeword is detected, the result generator 128 may continue processing the audio data and/or the text data. The speech processing performed by the result generator 128 may include, for example, additional automatic speech recognition, natural language understanding, entity recognition, and/or command generation from one or more applications residing on the device 102. In instances where the entire wakeword is detected, result data from the result generator 128 may be sent to the system 104 for further processing and/or use for generating a command in response to the user utterance. By so doing, the device 102 may be able to perform at least a portion of the speech processing and provide results thereof to the system 104 to decrease the processing performed by that the system 104, leading to decreased latency between when the user stops speaking and when the responsive command is performed.

At block 516, the result generator 128 and/or the routing component 122, having received the indication that the entire wakeword has been detected, may send the audio data and/or the result data to the system 104. In examples, the audio data may be sent to the system 104 for processing concurrently with the speech processing performed by the device.

At block 518, instead of the operations of blocks 510 to 516 being performed, the audio processor 124 and/or one or more other components of the device may determine that the entire wakeword is not detected from the audio data.

In these examples, at block 520, the audio processor 124 and/or the one or more other components may send a cancel command to the routing component 122, the audio processor 124, and/or the result generator 128. The cancel command may cause the speech processing being performed on the audio data to be stopped and may cause the device to refrain from sending the audio data and/or the speech processing result data to the system 104.

Figure 6:
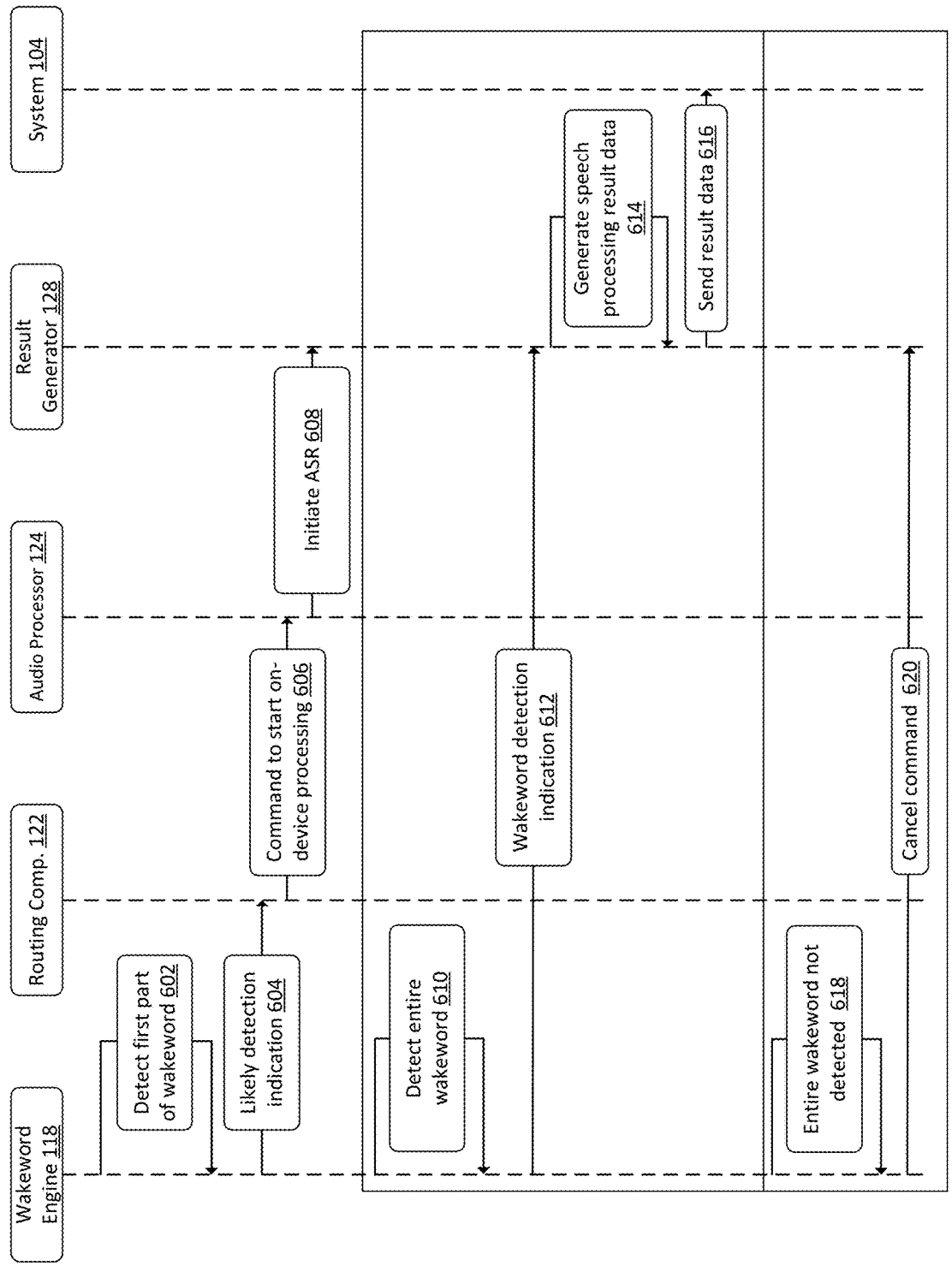
FIG. 6 illustrates a sequence diagram of an example process for preemptive wakeword detection where the entirety of the wakeword is detected from the wakeword engine that detected the likely wakeword.

FIG. 6 illustrates a sequence diagram of an example process for preemptive wakeword detection where the entirety of the wakeword is detected from the wakeword engine that detected the likely wakeword. It should be understood that the example processes described in FIG. 6 are provided in an illustrative order, but that the processes may be performed in other orders and/or in parallel.

At block 602, the wakeword engine 118 may detect a first part of a wakeword. For example, the wakeword model 120 may be configured to detect "Al," and/or "Ale," and/or "Alex" from the audio data.

At block 604, the wakeword engine 118 may send an indication of a likely wakeword detection to a routing component 122. For example, the indication may include data that indicates to the routing component 122 that the wakeword model 120 designed to detect the wakeword has detected a first part of the wakeword and/or that a wakeword model 120 designed to detect just the first part of the wakeword has detected the first part of the wakeword. In these and other examples, the indication may differentiate between likely wakeword detection and entire wakeword detection.

At block 606, the routing component 122 may send a command to an audio processor 124 to start on-device speech processing of the audio data. The command from the routing component 122 may be received at the audio processor 124 and may indicate that speech processing is to commence conditionally and that an indication of entire wakeword detection and/or that the entire wakeword was not detected is forthcoming.

At block 608, the audio process 124 may initiate automatic speech recognition processing and start sending results of the automatic speech recognition processing to a result generator 128. The audio processor 124 may be configured to perform one or more operations. Those operations may include initiating automatic speech recognition processing 126 on the audio data to determine words corresponding to the user utterance. The operations may also include performing speaker identification tasks, audio signature fingerprinting, wakeword verification, and/or other operations.

At block 610, the wakeword engine 118 may detect the entire wakeword from the audio data subsequent to when the wakeword engine 118 detected the first part of the wakeword. In this example, the wakeword engine 118 may utilize the audio data from which the likely wakeword was detected to further determine if the entirety of the wakeword is present in the audio data. For example, the wakeword engine 118 may be configured to detect the entire wakeword. As described above, one or more of the wakeword models 120 may be configured to detect the entire wakeword subsequent to when the first part of the wakeword is detected. In examples, the same wakeword model 120 that is configured to detect the first part of the wakeword may also be configured to detect the entire wakeword. In other examples, a first wakeword model 120 may be configured to detect the first part of the wakeword while a second wakeword model 120 may be configured to detect the entirety of the wakeword.

At block 612, in instances where the wakeword engine 118 detected the entire wakeword, the wakeword engine 118 may send the indication of the wakeword detection to the result generator 128.

At block 614, the result generator 128 may continue to perform speech processing on the audio data and/or the ASR result data to generate speech processing result data. This operation is performed in light of the entire wakeword being detected by the device. When the entire wakeword is detected, and/or prior to a determination of whether the entire wakeword is detected, the result generator 128 may continue processing the audio data and/or the text data. The speech processing performed by the result generator 128 may include, for example, additional automatic speech recognition, natural language understanding, entity recognition, and/or command generation from one or more applications residing on the device 102. In instances where the entire wakeword is detected, result data from the result generator 128 may be sent to the system 104 for further processing and/or use for generating a command in response to the user utterance. By so doing, the device 102 may be able to perform at least a portion of the speech processing and provide results thereof to the system 104 to decrease the processing performed by that the system 104, leading to decreased latency between when the user stops speaking and when the responsive command is performed.

At block 616, the result generator 128 and/or the routing component 122, having received the indication that the entire wakeword has been detected, may send the audio data and/or the result data to the system 104. In examples, the audio data may be sent to the system 104 for processing concurrently with the speech processing performed by the device.

At block 618, instead of the operations of blocks 610 to 616 being performed, the wakeword engine 118 and/or one or more other components of the device may determine that the entire wakeword is not detected from the audio data.

In these examples, at block 620, the wakeword engine 118 and/or the one or more other components may send a cancel command to the routing component 122, the audio processor 124, and/or the result generator 128. The cancel command may cause the speech processing being performed on the audio data to be stopped and may cause the device to refrain from sending the audio data and/or the speech processing result data to the system 104.

Figure 7:
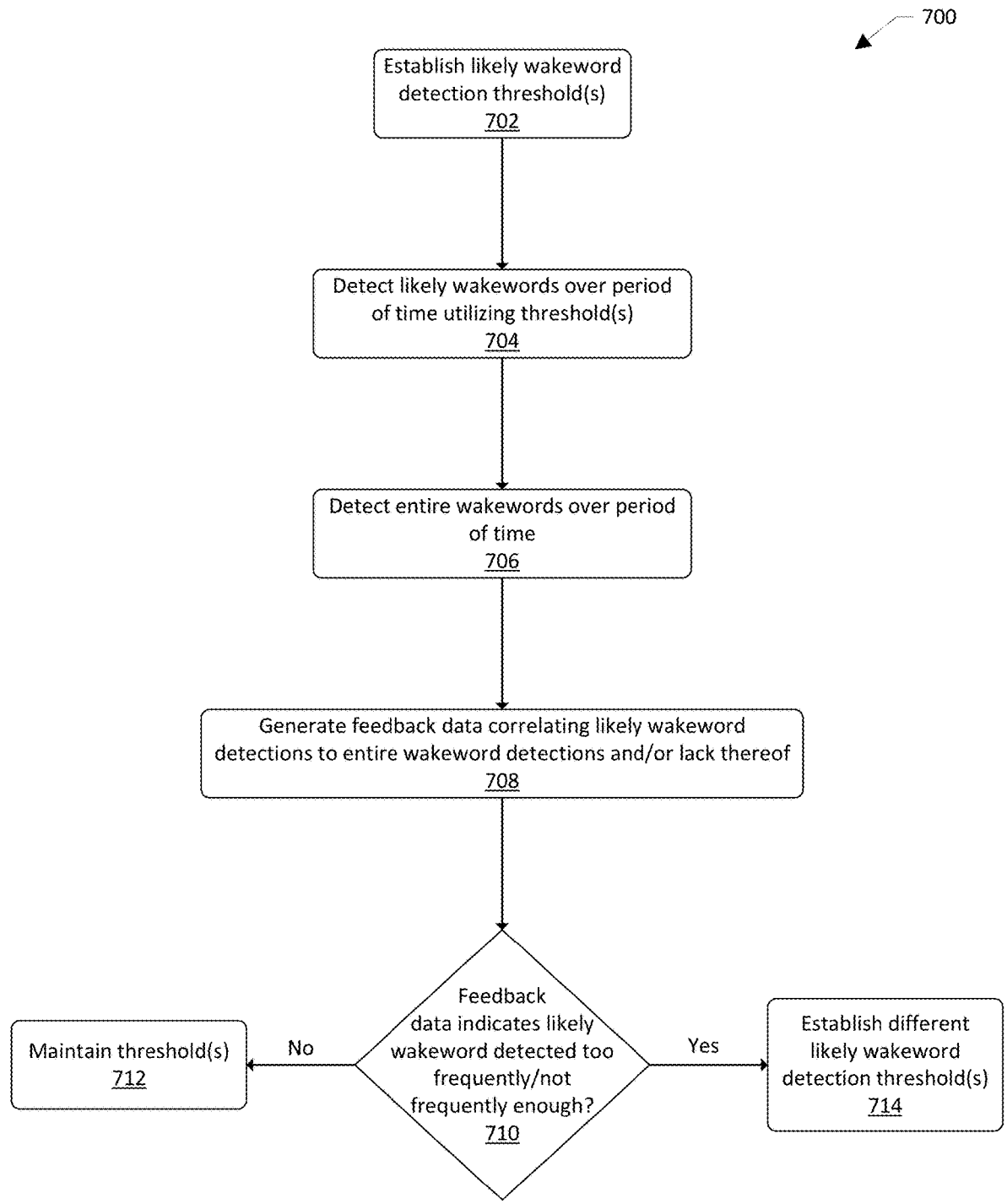
FIG. 7 illustrates a flow diagram of an example process for utilizing feedback data to determine wakeword detection thresholds.
Figure 8:
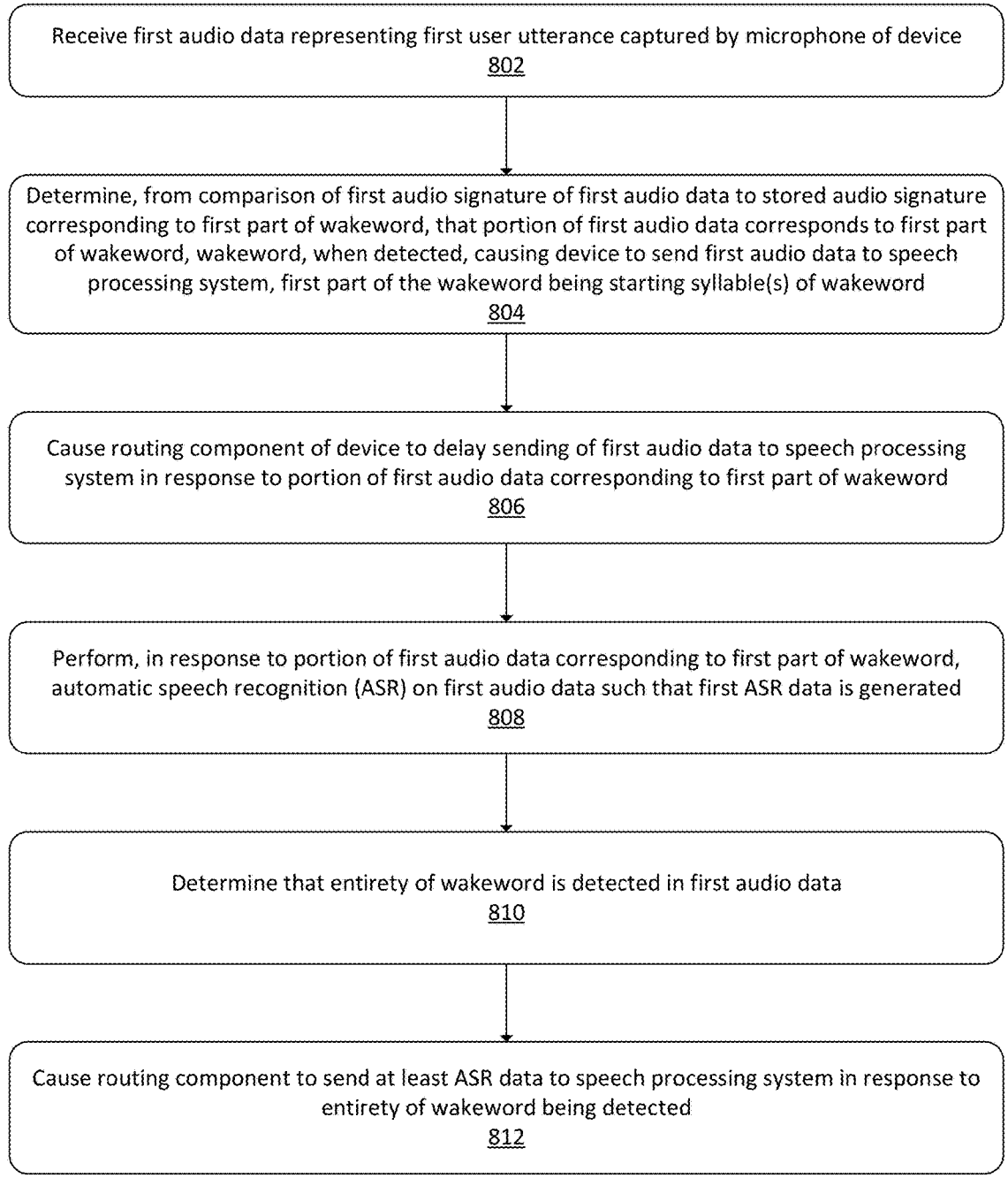
FIG. 8 illustrates a flow diagram of an example process for preemptive wakeword detection.
Figure 9:
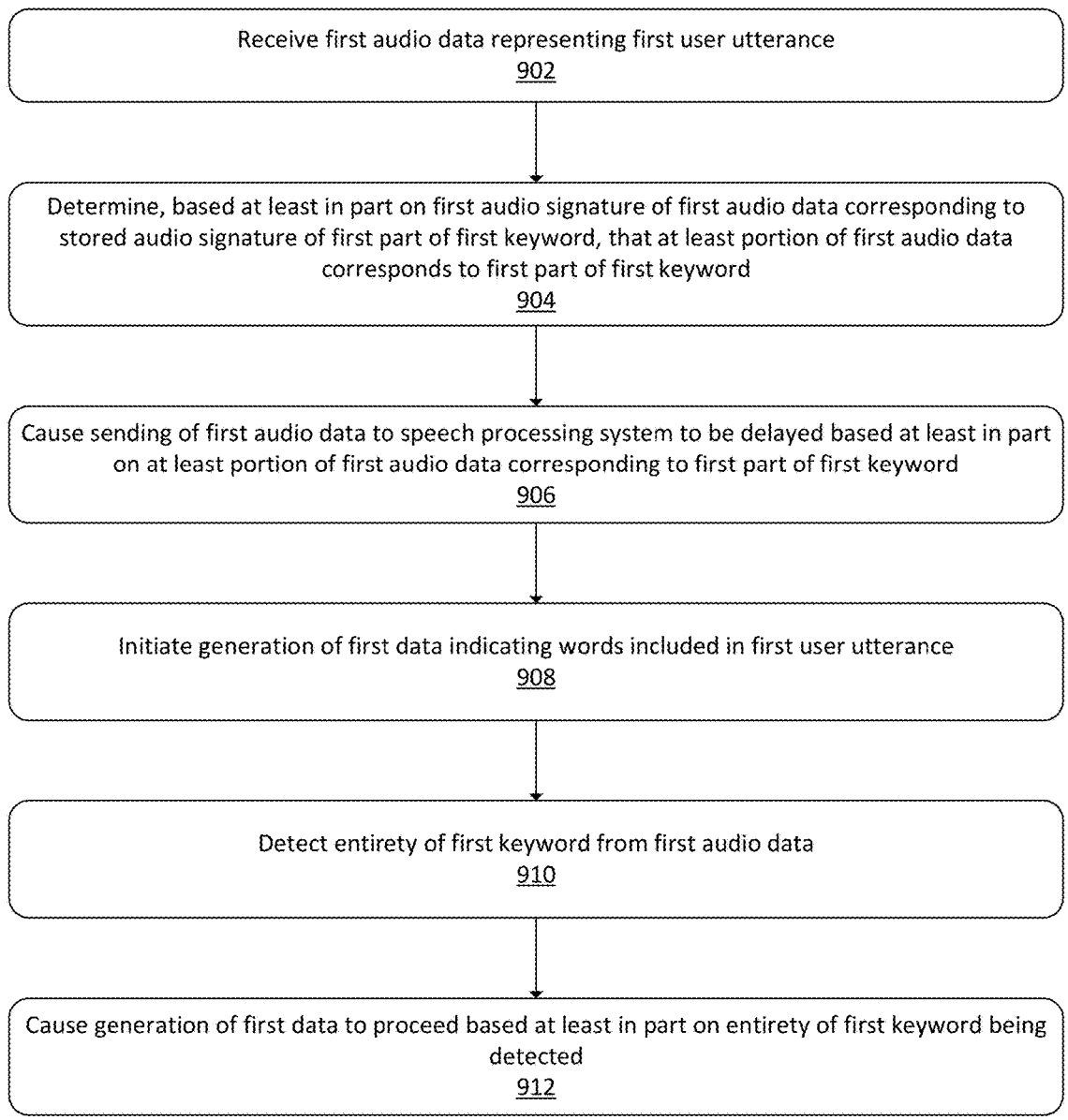
FIG. 9 illustrates a flow diagram of another example process for preemptive wakeword detection.

FIGS. 7-9 illustrates processes for preemptive wakeword detection. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 10, and 11, although the processes may be implemented in a wide variety of other environments, architectures and systems.

FIG. 7 illustrates a flow diagram of an example process 700 for utilizing feedback data to determine wakeword detection thresholds. The order in which the operations or steps are described is not intended to be construed as a limitation, and any number of the described operations may be combined in any order and/or in parallel to implement process 700.

At block 702, the process 700 may include establishing one or more likely wakeword detection thresholds. For example, the wakeword models as described herein may be initially trained to detect the likely wakeword using a first threshold. Example thresholds may be confidence based and/or may indicate how much of the wakeword is to correspond to the likely wakeword detection. An example threshold may be "Al" for the wakeword "Alexa." while another example threshold may be "Alex" for the wakeword "Alexa."

At block 704, the process 700 may include detecting one or more likely wakewords over a period of time utilizing the one or more likely wakeword detection thresholds. For example, the wakeword engine as described herein may be configured to detect likely wakewords from sample audio data.

At block 706, the process 700 may include detecting one or more entire wakewords over the period of time. For example, the wakeword engine as described herein may be configured to detect entire wakewords from the sample audio data. Additionally, or alternatively, the audio processor 124 as described herein may be configured to detect entire wakewords from the sample audio data.

At block 708, the process 700 may include generating feedback data correlating likely wakeword detections to entire wakeword detections and/or a lack thereof. The feedback data may indicate how frequently a likely wakeword detection also corresponded to an entire wakeword detection for the same sample audio data.

At block 710, the process 700 may include determining whether the feedback data indicates that the likely wakeword was detected too frequently or not frequently enough with respect to when the entire wakeword was detected. For example, if the feedback data indicates that the likely wakeword detection is not frequently accompanied by the entire wakeword detection, this data may indicate that the likely wakeword detection threshold should be adjusted to more closely align with the entire wakeword detection. If the feedback data indicates that the likely wakeword detection is always or nearly always accompanied by the entire wakeword detection, this data may indicate that the likely wakeword detection threshold should be relaxed such that more likely wakeword detections occur.

In examples where the feedback data indicates that the likely wakeword was not detected too frequently or not frequently enough, the process 700, at block 712, may include maintaining the likely wakeword detection thresholds without changes thereto. In these examples, the feedback data may indicate that the detection of likely wakewords is performing as expected and thus a need to adjust the likely wakeword detection threshold(s) is not present.

In examples where the feedback data indicates that the likely wakeword was detected too frequently or not frequently enough, the process 700, at block 714, may include establishing different likely wakeword detection thresholds. For example, when the likely wakeword was detected too frequently, or in other words when the likely wakeword was detected the entire wakeword was not detected indicating a false positive detection of the likely wakeword, the likely wakeword detection threshold may be changed to require more confidence of likely wakeword detection. When the likely wakeword was not detected when the entire wakeword was detected, the likely wakeword detection threshold may be changed to require less confidence of the likely wakeword detection.

FIG. 8 illustrates a flow diagram of an example process 800 for preemptive wakeword detection. The order in which the operations or steps are described is not intended to be construed as a limitation, and any number of the described operations may be combined in any order and/or in parallel to implement process 800.

At block 802, the process 800 may include receiving first audio data representing a first user utterance captured by a microphone of the device. For example, a user may speak the user utterance and the microphone of the device may capture audio representing that user utterance. Audio data representing the audio may be generated and utilized for processing as described herein.

At block 804, the process 800 may include determining, from a comparison of a first audio signature of the first audio data to a stored audio signature corresponding to a first part of a wakeword, that a portion of the first audio data corresponds to the first part of the wakeword, the wakeword, when detected, causing the device to send the first audio data to a speech processing system, the first part of the wakeword being one or more starting syllables of the wakeword. For example, a wakeword engine works in conjunction with other components of the device, for example the microphone to detect keywords in audio data. For example, the device may convert audio into audio data, and process the audio data with the wake word engine to determine whether human sound is detected, and if so, if the audio data comprising human sound matches an audio fingerprint and/or model corresponding to a particular keyword.

The device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by device (or separately from human sound detection), the device may use the wakeword engine to perform wakeword detection to determine when a user intends to speak a command to the device. This process may also be referred to as keyword detection, with the wakeword being a specific example of a keyword. Specifically, keyword detection may be performed without performing linguistic analysis, textual analysis or semantic analysis. Instead, incoming audio (or audio data) may be analyzed to determine if specific characteristics of the audio match preconfigured acoustic waveforms, audio fingerprints, or other data to determine if the incoming audio "matches" stored audio data corresponding to a keyword.

Thus, the wake word engine may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

At block 806, the process 800 may include causing a routing component of the device to delay sending of the first audio data to the speech processing system in response to the portion of the first audio data corresponding to the first part of the wakeword. For example, an indication that the detection was of a likely wakeword and/or a first part of the wakeword as opposed to the entire wakeword may be sent to the routing component. The routing component, having received data indicating that the detection is not of the entire wakeword, may determine to refrain from sending the audio data to the speech processing system until an indication that the entire wakeword was detected has been received.

At block 808, the process 800 may include performing, in response to the portion of the first audio data corresponding to the first part of the wakeword, automatic speech recognition (ASR) on the first audio data such that first ASR data is generated. For example, an audio processor of the device may initiate automatic speech recognition processing and start sending results of the automatic speech recognition processing to a result generator. The audio processor may be configured to perform one or more operations. Those operations may include initiating automatic speech recognition processing on the audio data to determine words corresponding to the user utterance. The operations may also include performing speaker identification tasks, audio signature fingerprinting, wakeword verification, and/or other operations.

At block 810, the process 800 may include determining that an entirety of the wakeword is detected in the first audio data. For example, the wakeword engine may be configured to detect the entire wakeword. As described above, one or more of the wakeword models may be configured to detect the entire wakeword subsequent to when the first part of the wakeword is detected. In examples, the same wakeword model that is configured to detect the first part of the wakeword may also be configured to detect the entire wakeword. In other examples, a first wakeword model may be configured to detect the first part of the wakeword while a second wakeword model may be configured to detect the entirety of the wakeword.

Additionally, or alternatively, the audio processor may detect the entire wakeword from the audio data subsequent to when the wakeword engine detected the first part of the wakeword. In this example, the audio processor may utilize the initial automatic speech recognition results to determine that the audio data included a word that corresponds to the wakeword. In examples, the audio processor, having initiated automatic speech recognition by an ASR component, may determine when the results of the initial processing indicate that one of the words in the user utterance corresponds to the wakeword. For example, when the results include text data, corresponding text of "Alexa, turn on the kitchen light" may include the entire wakeword, here "Alexa." In these examples, the audio processor may generate an indication that the entire wakeword was detected from the results. In other examples, the text data may indicate that the user utterance did not include the entire wakeword, such as when the user says "hey Al, turn on the kitchen light." In these examples, the audio processor may generate an indication that the entire wakeword was not detected from the results.

At block 812, the process 800 may include causing the routing component to send at least the ASR data to the speech processing system in response to the entirety of the wakeword being detected. For example, having detected the entire wakeword, whether from the wakeword engine and/or the audio processor, an indication of the entire wakeword detection may be sent to the routing component, which may receive the indication and send at least a portion of the results data from the on-device speech processing to the speech processing system, along with the audio data in examples.

Additionally, or alternatively, the process 800 may include receiving second audio data representing a second user utterance and detecting, at a wakeword engine of the device, the first part of the wakeword in the second audio data. The process 800 may also include imitating speech processing on the second audio data in response to detecting the first part of the wakeword in the second audio data. The process 800 may also include determining, at the wakeword engine, that the entirety of the wakeword is undetected from the second audio data. The process 800 may also include determining to refrain from sending the second audio data to the speech processing system in response to the entirety of the wakeword being undetected. The process 800 may also include causing the speech processing to cease in response to the entity of the wakeword being undetected.

Additionally, or alternatively, the process 800 may include receiving second audio data representing a second user utterance and detecting the first part of the wakeword in the second audio data. The process 800 may also include initiating speech processing on the second audio data in response to detecting the first part of the wakeword in the second audio data such that second data representing the second user utterance is generated. The process 800 may also include determining that the entirety of the wakeword is absent from the second data. The process 800 may also include causing the speech processing to cease in response to the entirety of the wakeword being absent from the second data.

Additionally, or alternatively, the process 800 may include identifying, from the first data, the entirety of the wakeword in the words of the first user utterance. In these instances, causing the routing component to send the at least the first data to the speech processing system may be in response to the entirety of the wakeword being identified from the first data.

Additionally, or alternatively, the process 800 may include in response to determining that the portion of the first audio data corresponds to the first part of the wakeword, selecting a first speech processing component associated with the wakeword to perform speech processing on the first audio data, wherein performing the speech processing is performed by the first speech processing component. The process 800 may also include receiving second audio data representing a second user utterance and detecting a first portion of a keyword other than the wakeword from the second audio data. The process 800 may also include selecting a second speech processing component associated with the keyword in response to detecting the first portion of the keyword. The process 800 may also include performing, using the second speech processing component, speech processing on the second audio data.

FIG. 9 illustrates a flow diagram of another example process 900 for preemptive wakeword detection. The order in which the operations or steps are described is not intended to be construed as a limitation, and any number of the described operations may be combined in any order and/or in parallel to implement process 900.

At block 902, the process 900 may include receiving first audio data representing a first user utterance. For example, a user may speak the user utterance and the microphone of the device may capture audio representing that user utterance. Audio data representing the audio may be generated and utilized for processing as described herein.

At block 904, the process 900 may include determining, based at least in part on a first audio signature of the first audio data corresponding to a stored audio signature of a first part of a first keyword, that at least a portion of the first audio data corresponds to the first part of the first keyword. For example, a wake word engine works in conjunction with other components of the device, for example the microphone to detect keywords in audio data. For example, the device may convert audio into audio data, and process the audio data with the wake word engine to determine whether human sound is detected, and if so, if the audio data comprising human sound matches an audio fingerprint and/or model corresponding to a particular keyword.

The device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by device (or separately from human sound detection), the device may use the wakeword engine to perform wakeword detection to determine when a user intends to speak a command to the device. This process may also be referred to as keyword detection, with the wakeword being a specific example of a keyword. Specifically, keyword detection may be performed without performing linguistic analysis, textual analysis or semantic analysis. Instead, incoming audio (or audio data) may be analyzed to determine if specific characteristics of the audio match preconfigured acoustic waveforms, audio fingerprints, or other data to determine if the incoming audio "matches" stored audio data corresponding to a keyword.

Thus, the wake word engine may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

At block 906, the process 900 may include causing sending of the first audio data to a speech processing system to be delayed based at least in part on the at least the portion of the first audio data corresponding to the first part of the wakeword. For example, an indication that the detection was of a likely wakeword and/or a first part of the wakeword as opposed to the entire wakeword may be sent to the routing component. The routing component, having received data indicating that the detection is not of the entire wakeword, may determine to refrain from sending the audio data to the speech processing system until an indication that the entire wakeword was detected has been received.

At block 908, the process 900 may include initiating generation of first data indicating words included in the first user utterance. For example, an audio processor of the device may initiate automatic speech recognition processing and start sending results of the automatic speech recognition processing to a result generator. The audio processor may be configured to perform one or more operations. Those operations may include initiating automatic speech recognition processing on the audio data to determine words corresponding to the user utterance. The operations may also include performing speaker identification tasks, audio signature fingerprinting, wakeword verification, and/or other operations.

At block 910, the process 900 may include detecting an entirety of the wakeword from the first audio data. For example, the wakeword engine may be configured to detect the entire wakeword. As described above, one or more of the wakeword models may be configured to detect the entire wakeword subsequent to when the first part of the wakeword is detected. In examples, the same wakeword model that is configured to detect the first part of the wakeword may also be configured to detect the entire wakeword. In other examples, a first wakeword model may be configured to detect the first part of the wakeword while a second wakeword model may be configured to detect the entirety of the wakeword.

At block 912, the process 900 may include causing generation of the first data to proceed based at least in part on the entirety of the first keyword being detected. Additionally, having detected the entire wakeword, whether from the wakeword engine and/or the audio processor, an indication of the entire wakeword detection may be sent to the routing component, which may receive the indication and send at least a portion of the results data from the on-device speech processing to the speech processing system, along with the audio data in examples.

Additionally, or alternatively, the process 900 may include receiving second audio data representing a second user utterance and detecting, at a wakeword engine of a device that received the first audio data, the first part of the first keyword in the second audio data. The process 900 may also include initiating, on the device, speech processing on the second audio data based at least in part on detecting the first part of the first keyword in the second audio data. The process 900 may also include determining, at the wakeword engine, that the entirety of the first keyword is undetected. The process 900 may also include determining to refrain from sending the second audio data to the speech processing system based at least in part on the entirety of the first keyword being undetected. The process 900 may also include causing the speech processing to cease based at least in part on the entirety of the first keyword being undetected.

Additionally, or alternatively, the process 900 may include receiving second audio data representing a second user utterance and detecting the first part of the first keyword in the second audio data. The process 900 may also include performing speech processing on the second audio data based at least in part on detecting the first part of the first keyword in the second audio data such that second data representing the second user utterance is generated. The process 900 may also include determining, from the second data, that the entirety of the first keyword is absent from the second data. The process 900 may also include causing the speech processing to cease based at least in part on the entirety of the first keyword being absent from the second data.

Additionally, or alternatively, the process 900 may include identifying, based at least in part on the first data, the entirety of the first keyword in words of the first user utterance. In these examples, sending the at least the first data to the speech processing system may be based at least in part on the entirety of the first keyword being identified from the first data.

Additionally, or alternatively, the process 900 may include, based at least in part on determining that the portion of the first audio data corresponds to the first part of the first keyword, selecting a first speech processing component associated with the first keyword to perform speech processing on the first audio data, wherein performing the speech processing is performed by the first speech processing component. The process 900 may also include receiving second audio data representing a second user utterance and detecting a first portion of a second keyword from the second audio data. The process 900 may also include selecting a second speech processing component associated with the second keyword based at least in part on detecting the first portion of the second keyword. The process 900 may also include performing, using the second speech processing component, speech processing on the second audio data.

Additionally, or alternatively, the process 900 may include storing second data indicating a first confidence threshold for detecting the first part of the first keyword. The process 900 may also include receiving third data indicating when both the first part of the first keyword is detected and the entirety of the first keyword is detected in sample audio data. The process 900 may also include generating, based at least in part on the third data, fourth data indicating a second confidence threshold for detecting the first part of the first keyword, the second confidence threshold differing from the first confidence threshold.

Additionally, or alternatively, the process 900 may include determining that the at least the portion of the first audio data corresponds to the first part of the first keyword utilizing a wakeword model of a wakeword engine disposed on a device that received the first audio data. The process 900 may also include detecting the entirety of the first keyword by the wakeword engine based at least in part on the wakeword model determining that the at least the portion of the first audio data corresponds to the first keyword.

Additionally, or alternatively, the process 900 may include determining that the at least the portion of the first audio data corresponds to the first part of the first keyword utilizing a first wakeword model of a wakeword engine disposed on a device that received the first audio data and configured to detect the first part of the wakeword. The process 900 may also include detecting the entirety of the first keyword by the wakeword engine utilizing a second wakeword model configured to detect the entirety of the keyword.

Additionally, or alternatively, the process 900 may include receiving second audio data representing a second user utterance and detecting, at a wakeword engine of a device that received the first audio data, the first part of the first keyword in the second audio data. The process 900 may also include performing, on the device, speech processing on the second audio data based at least in part on detecting the first part of the first keyword in the second audio data such that second data representing the second user utterance is generated. The process 900 may also include detecting, at the wakeword engine, the entirety of the first keyword. The process 900 may also include sending the second data to the speech processing system based at least in part on the entirety of the first keyword being detected at the wakeword engine.

Additionally, or alternatively, the process 900 may include receiving second audio data representing a second user utterance and detecting, prior to sending the second audio data to a wakeword engine of a device that received the first audio data, a feature of the second audio data that corresponds to the first part of the first keyword. The process 900 may also include initiating, on the device, speech processing on the second audio data based at least in part on detecting the feature. The process 900 may also include detecting, at the wakeword engine, the entirety of the wakeword. The process 900 may also include causing the speech processing to continue based at least in part on the entirety of the first keyword being detected at the wakeword engine.

Figure 10:
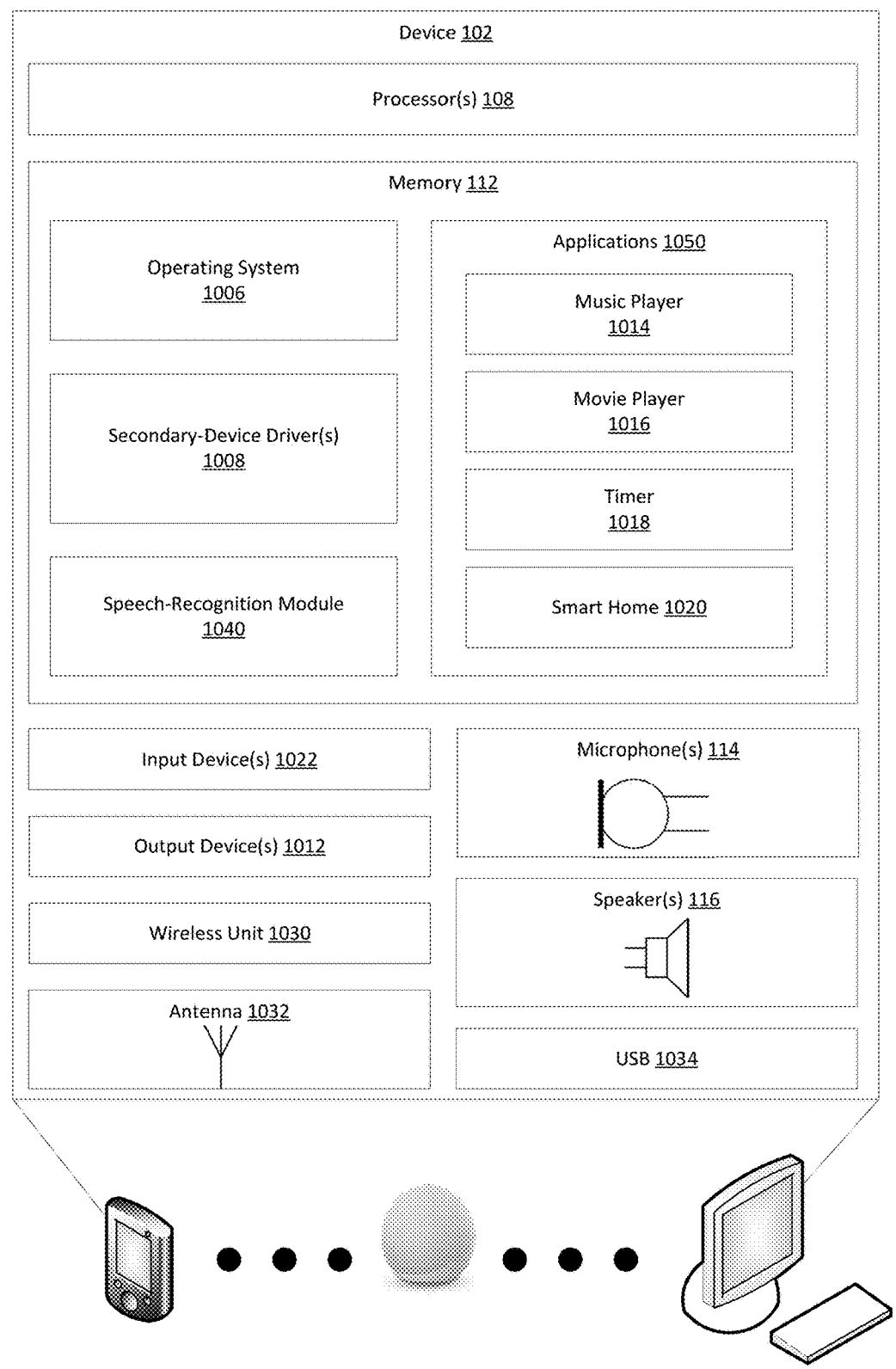
FIG. 10 illustrates a conceptual diagram of components of an example device on which local speech processing and request routing may be performed.

FIG. 10 illustrates a conceptual diagram of components of an example device on which preemptive wakeword detection and subsequent audio data processing may be performed. The device 102 may be implemented as a standalone device that is relatively simple in terms of functional capabilities with limited input/output components, memory, and processing capabilities. For instance, the device 102 does not have a keyboard, keypad, or other form of mechanical input. Nor does it have a display (other than simple lights, for instance) or touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 102 is through voice input and audible output.

The device 102 may also be implemented in other form factors, such as a mobile device (e.g., a smart phone or personal digital assistant). The mobile device may include a touch-sensitive display screen and various buttons for providing input as well as additional functionality such as the ability to send and receive telephone calls. Alternative implementations of the device 102 may also include configuration as a personal computer. The personal computer may include a keyboard, a mouse, a display screen, and any other hardware or functionality that is typically found on a desktop, notebook, netbook, or other personal computing devices. These devices, however, are merely examples and not intended to be limiting, as the techniques described in this disclosure may be used in essentially any device that has an ability to recognize speech input or other types of natural language input.

In the illustrated implementation, the device 102 includes one or more processors 108 and memory 112. In some implementations, the processors(s) 108 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 may possess its own local memory, which also may store program modules, program data, and/or one or more operating systems. The memory 112 may include components described with respect to FIG. 1A.

Several modules such as instruction, datastores, and so forth may be stored within the memory 112 and configured to execute on the processor(s) 108. A few example functional modules are shown as applications stored in the memory 112 and executed on the processor(s) 108, although the same functionality may alternatively be implemented in hardware, firmware, or as a system on a chip (SOC). At least some of the components shown in FIG. 1A may also be stored in the memory 112 and executable by the processor(s) 108 to implement the functionality described herein.

An operating system component 1006 may be configured to manage hardware within and coupled to the device 102 for the benefit of other components. In addition, in some instances the device 102 may include some or all of one or more secondary-device drivers 1008. In other instances, meanwhile, the device 102 may be free from the drivers 1008 for interacting with second devices. The device 102 may further including, in some instances, a speech-recognition module 1040, which may correspond to the on-device speech processing described with reference to FIG. 1A.

The device 102 may also include a plurality of applications 1050 stored in the memory 112 or otherwise accessible to the device 102. In this implementation, the applications 1050 are a music player 1014, a movie player 1016, a timer 1018, and a smart home application 1020. However, the device 102 may include any number or type of applications and is not limited to the specific examples shown here. The music player 1014 may be configured to play songs or other audio files. The movie player 1016 may be configured to play movies or other audio visual media. The timer 1018 may be configured to provide the functions of a simple timing device and clock. The smart home application 1020 may be configured to assist in controlling smart devices. When implementing the "hybrid" functionality described herein where a system 104 is unavailable to the device 102 and/or when the device 102 is configured to respond to intents without aid from the system 104, these applications 1050 may be configured to access on-device resources (e.g., on-device music or movie libraries, an on-device shopping list, an on-device calendar, etc.). In some cases, changes made to these on-device resources may be synched with off-device versions of those resources when the system 104 subsequently becomes available to the device 102.

Generally, the device 102 has input devices 1022 and output devices 1012. The input devices 1022 may include, without limitation, a keyboard, keypad, mouse, touch screen, joystick, control buttons, etc. In some implementations, one or more microphones 114, which may be similar to the microphone(s) 114 of FIG. 1A and may function as input devices 1022 to receive audio input, such as user voice input. The output device(s) 1012 may be similar to the output device(s) of FIG. 1A, and may include, without limitation, a display(s), a light element (e.g., LED), a vibrator to create haptic sensations, or the like. In some implementations, one or more speakers 116 may function as output devices 1012 to output audio sounds (e.g., audio content, TTS responses, tones at various frequencies, etc.).

A user may interact with the device 102 by speaking to it, and the one or more microphone(s) 114 captures the user's speech. The device 102 can communicate back to the user by emitting audible statements through the speaker 116. In this manner, the user can interact with the device 102 solely through speech, without use of a keyboard or display.

The device 102 may further include a wireless unit 1030 coupled to an antenna 1032 to facilitate a wireless connection to a network. The wireless unit 1030 may implement one or more of various wireless and/or IoT technologies, such as Bluetooth® protocol, Bluetooth Low Energy (BLE) protocol, ZigBee® protocol, Z-wave® protocol, WiFi protocol, and/or any other type of protocol usable to communicate wirelessly between electronic devices in an environment, including those that do and/or do not rely data transmission over the wide area network 108. As such, the device 102 may be configured to act as a hub that can communicate with second devices in the environment and control the second devices, such as by using protocol stacks, drivers, and adapters to communicate over a suitable communications protocol. A USB port 1034 may further be provided as part of the device 102 to facilitate a wired connection to a network, or a plug-in network device that communicates with other wireless networks. In addition to the USB port 1034, or as an alternative thereto, other forms of wired connections may be employed, such as a broadband connection, Transmission Control Protocol/Internet Protocol (TCP/IP) protocol connection, etc.

Accordingly, when implemented as the primarily-voice-operated speech interface device 102, there may be no input devices, such as navigation buttons, keypads, joysticks, keyboards, touch screens, and the like other than the microphone(s) 114. Further, there may be no output such as a display for text or graphical output. The speaker(s) 116 may be the main output device. In one implementation, the device 102 may include non-input control mechanisms, such as basic volume control button(s) for increasing/decreasing volume, as well as power and reset buttons. There may also be a simple light element (e.g., LED) to indicate a state such as, for example, when power is on.

Accordingly, the device 102 may be implemented as an aesthetically appealing device with smooth and rounded surfaces, with one or more apertures for passage of sound waves. The device 102 may merely have a power cord and optionally a wired interface (e.g., broadband, USB, etc.). As a result, the device 102 may be generally produced at a low cost. Once plugged in, the device 102 may automatically self-configure, or with slight aid of the user, and be ready to use. In other implementations, other I/O components may be added to this basic model, such as specialty buttons, a keypad, display, and the like.

Figure 11:
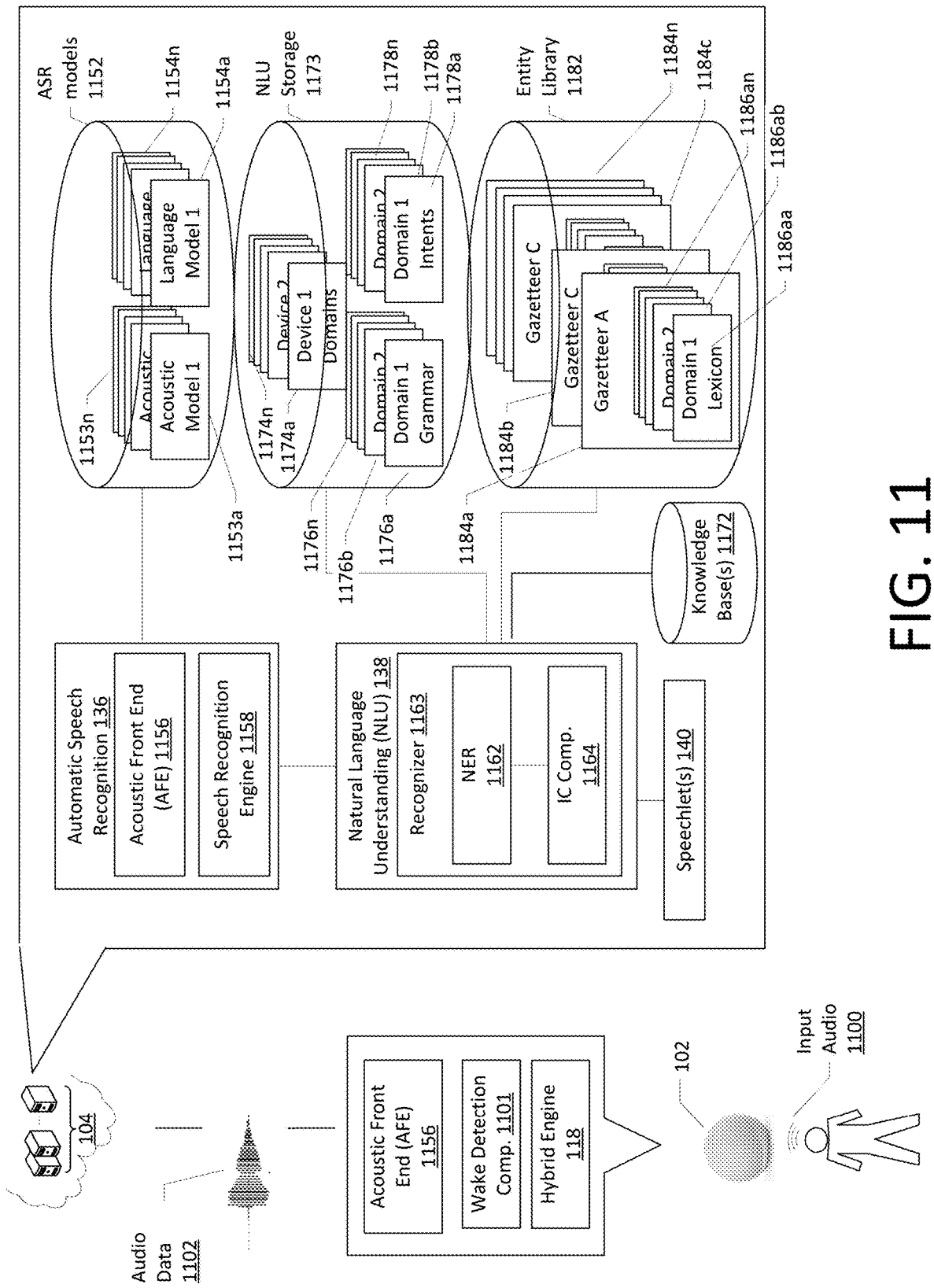
FIG. 11 illustrates a conceptual diagram of components of a speech-processing system for processing audio data provided by one or more devices.

FIG. 11 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 11 may occur directly or across a network 106. An audio capture component, such as a microphone 114 of the device 102, or another device, captures audio 1100 corresponding to a spoken utterance. The device 102, using a wake word engine 1101, then processes audio data corresponding to the audio 1100 to determine if a keyword (such as a wakeword) is detected in the audio data. Following detection of a wakeword, the device 102 processes audio data 1102 corresponding to the utterance utilizing an ASR component 136. The audio data 1102 may be output from an optional acoustic front end (AFE) 1156 located on the device prior to transmission. In other instances, the audio data 1102 may be in a different form for processing by a remote AFE 1156, such as the AFE 1156 located with the ASR component 136.

The wake word engine 1101 works in conjunction with other components of the user device, for example a microphone to detect keywords in audio 1100. For example, the device may convert audio 1100 into audio data, and process the audio data with the wake word engine 1101 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1101 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 1101 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the device 102 may "wake." The audio data 1102 may include data corresponding to the wakeword. Further, a device may "wake" upon detection of speech/spoken audio above a threshold, as described herein. An ASR component 136 may convert the audio data 1102 into text. The ASR transcribes audio data into text data representing the words of the speech contained in the audio data 1102. The text data may then be used by other components for various purposes, such as executing system commands, inputting data, etc. A spoken utterance in the audio data is input to a processor configured to perform ASR which then interprets the utterance based on the similarity between the utterance and pre-established language models 1154 stored in an ASR model knowledge base (ASR Models Storage 1152). For example, the ASR process may compare the input audio data with models for sounds (e.g., subword units or phonemes) and sequences of sounds to identify words that match the sequence of sounds spoken in the utterance of the audio data. As described in more detail herein, the device 102 may include a hybrid engine 118, which may perform the same or similar functions as the hybrid engine 118 as described with respect to FIG. 1A. In these examples, at least a portion of the speech processing described with respect to the system 104 may be performed by the device 102.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1153 stored in an ASR Models Storage 1152), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 136 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1156 and a speech recognition engine 1158. The acoustic front end (AFE) 1156 transforms the audio data from the microphone into data for processing by the speech recognition engine 1158. The speech recognition engine 1158 compares the speech recognition data with acoustic models 1153, language models 1154, and other data models and information for recognizing the speech conveyed in the audio data. The AFE 1156 may reduce noise in the audio data and divide the digitized audio data into frames representing time intervals for which the AFE 1156 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1158 may process the output from the AFE 1156 with reference to information stored in speech/model storage (1152). Alternatively, post frontend processed data (such as feature vectors) may be received by the device executing ASR processing from another source besides the internal AFE. For example, the user device may process audio data into feature vectors (for example using an on-device AFE 1156).

The speech recognition engine 1158 attempts to match received feature vectors to language phonemes and words as known in the stored acoustic models 1153 and language models 1154. The speech recognition engine 1158 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, order ice cream and milk?" The wake detection component may identify the wake word, otherwise described as a trigger expression, "Alexa." in the user utterance and may "wake" based on identifying the wake word. The speech recognition engine 1158 may identify, determine, and/or generate text data corresponding to the user utterance, here "order ice cream and milk."

The speech recognition engine 1158 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1158 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 138 may include various components, including potentially dedicated processor(s), memory, storage, etc. As shown in FIG. 11, an NLU component 138 may include a recognizer 1163 that includes a named entity recognition (NER) component 1162 which is used to identify portions of query text that correspond to a named entity that may be recognizable by the system. A downstream process called named entity resolution links a text portion to a specific entity known to the system. To perform named entity resolution, the system may utilize gazetteer information (1184a-1184n) stored in entity library storage 1182. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 136 based on the utterance input audio 1100) and attempts to make a semantic interpretation of the text. That is, the NLU process determines the meaning behind the text based on the individual words and then implements that meaning. NLU processing 140 interprets a text string to derive an intent or a desired action from the user as well as the pertinent pieces of information in the text that allow a device (e.g., device 102) to complete that action. For example, if a spoken utterance is processed using ASR 136 and outputs the text "order ice cream and milk" the NLU process may determine that the user intended to order food, with the food being ice cream and milk.

The NLU 138 may process several textual inputs related to the same utterance. For example, if the ASR 136 outputs N text segments (as part of an N-best list), the NLU may process all N outputs to obtain NLU results.

As will be discussed further below, the NLU process may be configured to parse and tag to annotate text as part of NLU processing. For example, for the text "order ice cream and milk," "order" may be tagged as a command (to purchase items) and "ice cream" and "milk" may be tagged as the naming identifiers of the items to be purchased.

To correctly perform NLU processing of speech input, an NLU process 138 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1162 receives a query in the form of ASR results and attempts to identify relevant grammars and lexical information that may be used to construe meaning. To do so, the NLU component 138 may begin by identifying potential domains that may relate to the received query. The NLU storage 1173 includes a database of devices (1174a-1174n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 1163, language model and/or grammar database (1176a-1176n), a particular set of intents/actions (1178a-1178n), and a particular personalized lexicon (1186). Each gazetteer (1184a-1184n) may include domain-indexed lexical information associated with a particular user and/or device. For example, the Gazetteer A (1184a) includes domain-index lexical information 1186aa to 1186an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1164 parses the query to determine an intent or intents for each identified domain, where the intent corresponds to the action to be performed that is responsive to the query. Each domain is associated with a database (1178a-1178n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 1164 identifies potential intents for each identified domain by comparing words in the query to the words and phrases in the intents database 1178. In some instances, the determination of an intent by the IC component 1164 is performed using a set of rules or templates that are processed against the incoming text to identify a matching intent.

In order to generate a particular interpreted response, the NER 1162 applies the grammar models and lexical information associated with the respective domain to actually recognize a mention of one or more entities in the text of the query. In this manner, the NER 1162 identifies "slots" or values (i.e., particular words in query text) that may be needed for later command processing. Depending on the complexity of the NER 1162, it may also label each slot with a type of varying levels of specificity (such as noun, place, device name, device location, city, artist name, song name, amount of time, timer number, or the like). Each grammar model 1176 includes the names of entities (i.e., nouns) commonly found in speech about the particular domain (i.e., generic terms), whereas the lexical information 1186 from the gazetteer 1184 is personalized to the user(s) and/or the device. For instance, a grammar model associated with the shopping domain may include a database of words commonly used when people discuss shopping.

The intents identified by the IC component 1164 are linked to domain-specific grammar frameworks (included in 1176) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (1176) framework or frameworks may correspond to sentence structures such as "purchase item called 'Item A' from Marketplace A."

For example, the NER component 1162 may parse the query to identify words as subject, object, verb, preposition, etc., based on grammar rules and/or models, prior to recognizing named entities. The identified verb may be used by the IC component 1164 to identify intent, which is then used by the NER component 1162 to identify frameworks. A framework for the intent of "play a song," meanwhile, may specify a list of slots/fields applicable to play the identified "song" and any object modifier (e.g., specifying a music collection from which the song should be accessed) or the like. The NER component 1162 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1162 may search the database of generic words associated with the domain (in the knowledge base 1172). So, for instance, if the query was "identify this song," after failing to determine which song is currently being output, the NER component 1162 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 140. The speechlet 140 may be determined based on the NLU output. For example, if the NLU output includes a command to send a message, the speechlet 140 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 140 may provide some or all of this information to a text-to-speech (TTS) engine. The TTS engine may then generate an actual audio file for outputting the audio data determined by the application (e.g., "okay," or "items ordered").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 138 during runtime operations where NLU operations are performed on text (such as text output from an ASR component 136). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1163. Each recognizer may include various NLU components such as an NER component 1162, IC component 1164 and other components such as an entity resolver, or other components.

For example, a messaging domain recognizer 1163-A (Domain A) may have an NER component 1162-A that identifies what slots (i.e., portions of input text) may correspond to particular words relevant to that domain. The words may correspond to entities such as (for the messaging domain) a recipient. An NER component 1162 may use a machine learning model, such as a domain specific conditional random field (CRF) to both identify the portions corresponding to an entity as well as identify what type of entity corresponds to the text portion. The messaging domain recognizer 1163-A may also have its own intent classification (IC) component 1164-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 104, as illustrated herein are exemplary, and may be located in a stand-alone device or may be included, in whole or in part, as a component of a larger device or system, may be distributed across a network or multiple devices connected by a network, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
   one or more processors; and
   non-transitory computer-readable media storing computer-executable instructions that, when executed by the one or more processors, cause the one or more processors to perform operations comprising:
      receiving first audio data representing a first user utterance captured by a microphone of the device;
      determining, from a comparison of a first audio signature of the first audio data to a stored audio signature corresponding to a first part of a wakeword, that a portion of the first audio data corresponds to the first part of the wakeword, the wakeword, when detected, causing the device to send the first audio data to a speech processing system, the first part of the wakeword being one or more starting syllables of the wakeword;
      performing, in response to the portion of the first audio data corresponding to the first part of the wakeword, automatic speech recognition (ASR) on the first audio data such that first ASR data is generated; and
      determining that an entirety of the wakeword is detected in the first audio data.

2. The device of claim 1, the operations further comprising:
   storing first data indicating a first confidence threshold for detecting the first part of the wakeword;
   receiving second data indicating when both the first part of the wakeword is detected and the entirety of the wakeword is detected in sample audio data; and
   generating, based at least in part on the second data, third data indicating a second confidence threshold for detecting the first part of the wakeword, the second confidence threshold differing from the first confidence threshold.

3. The device of claim 1, the operations further comprising:
   receiving second audio data representing a second user utterance;
   detecting the first part of the wakeword in the second audio data;
   initiating speech processing on the second audio data in response to detecting the first part of the wakeword in the second audio data such that second data representing a first part of the second user utterance is generated;
   determining that the entirety of the wakeword is absent from the second data; and
   causing the speech processing to cease in response to the entirety of the wakeword being absent from the second data.

4. The device of claim 1, the operations further comprising:
   in response to determining that the portion of the first audio data corresponds to the first part of the wakeword, selecting a first speech processing component associated with the wakeword to perform speech processing on the first audio data, wherein performing the speech processing is performed by the first speech processing component;
   receiving second audio data representing a second user utterance;
   detecting a first portion of a keyword other than the wakeword from the second audio data;
   selecting a second speech processing component associated with the keyword in response to detecting the first portion of the keyword; and
   performing, using the second speech processing component, speech processing on the second audio data.

5. A method, comprising:
   receiving first audio data representing a first user utterance;
   determining, based at least in part on a first audio signature of the first audio data corresponding to a stored audio signature of a first part of a first keyword, that at least a portion of the first audio data corresponds to the first part of the first keyword;
   initiating generation of first data indicating words included in the first user utterance;
   detecting an entirety of the first keyword from the first audio data; and
   causing generation of the first data to proceed based at least in part on the entirety of the first keyword being detected.

6. The method of claim 5, further comprising:
receiving second audio data representing a second user utterance;
detecting, at a wakeword engine of a device that received the first audio data, the first part of the first keyword in the second audio data;
initiating, on the device, speech processing on the second audio data based at least in part on detecting the first part of the first keyword in the second audio data;
determining, at the wakeword engine, that the entirety of the first keyword is undetected; and
causing the speech processing to cease based at least in part on the entirety of the first keyword being undetected.

7. The method of claim 5, further comprising:
receiving second audio data representing a second user utterance;
detecting the first part of the first keyword in the second audio data;
performing speech processing on the second audio data based at least in part on detecting the first part of the first keyword in the second audio data such that second data representing the second user utterance is generated;
determining, from the second data, that the entirety of the first keyword is absent from the second data; and
causing the speech processing to cease based at least in part on the entirety of the first keyword being absent from the second data.

8. The method of claim 5, further comprising:
based at least in part on determining that the portion of the first audio data corresponds to the first part of the first keyword, selecting a first speech processing component associated with the first keyword to perform speech processing on the first audio data, wherein performing the speech processing is performed by the first speech processing component;
receiving second audio data representing a second user utterance;
detecting a first portion of a second keyword from the second audio data;
selecting a second speech processing component associated with the second keyword based at least in part on detecting the first portion of the second keyword; and
performing, using the second speech processing component, speech processing on the second audio data.

9. The method of claim 5, further comprising:
storing second data indicating a first confidence threshold for detecting the first part of the first keyword;
receiving third data indicating when both the first part of the first keyword is detected and the entirety of the first keyword is detected in sample audio data; and
generating, based at least in part on the third data, fourth data indicating a second confidence threshold for detecting the first part of the first keyword, the second confidence threshold differing from the first confidence threshold.

10. The method of claim 5, wherein:
determining that the at least the portion of the first audio data corresponds to the first part of the first keyword is performed utilizing a wakeword model of a wakeword engine disposed on a device that received the first audio data; and
detecting the entirety of the first keyword is performed by the wakeword engine based at least in part on the wakeword model determining that the at least the portion of the first audio data corresponds to the first keyword.

11. The method of claim 5, wherein:
determining that the at least the portion of the first audio data corresponds to the first part of the first keyword is performed utilizing a first wakeword model of a wakeword engine disposed on a device that received the first audio data and configured to detect the first part of the first keyword; and
detecting the entirety of the first keyword is performed by the wakeword engine utilizing a second wakeword model configured to detect the entirety of the first keyword.

12. The method of claim 5, further comprising:
receiving second audio data representing a second user utterance;
detecting, prior to sending the second audio data to a wakeword engine of a device that received the first audio data, a feature of the second audio data that corresponds to the first part of the first keyword;
initiating, on the device, speech processing on the second audio data based at least in part on detecting the feature;
detecting, at the wakeword engine, the entirety of the wakeword; and
causing the speech processing to continue based at least in part on the entirety of the first keyword being detected at the wakeword engine.

13. A device, comprising:
one or more processors; and
non-transitory computer-readable media storing computer-executable instructions that, when executed by the one or more processors, cause the one or more processors to perform operations comprising:
receiving first audio data representing a first user utterance;
determining, based at least in part on a first audio signature of the first audio data corresponding to a stored audio signature of a first part of a first keyword, that at least a portion of the first audio data corresponds to the first part of the first keyword;
initiating generation of first data indicating words included in the first user utterance;
detecting an entirety of the first keyword from the first audio data; and
causing generation of the first data to proceed based at least in part on the entirety of the first keyword being detected.

14. The device of claim 13, the operations further comprising:
receiving second audio data representing a second user utterance;
detecting, at a wakeword engine of a device that received the first audio data, the first part of the first keyword in the second audio data;
initiating, on the device, speech processing on the second audio data based at least in part on detecting the first part of the first keyword in the second audio data;
determining, at the wakeword engine, that the entirety of the first keyword is undetected; and
causing the speech processing to cease based at least in part on the entirety of the first keyword being undetected.

15. The device of claim 13, the operations further comprising:
receiving second audio data representing a second user utterance;

detecting the first part of the first keyword in the second audio data;

performing speech processing on the second audio data based at least in part on detecting the first part of the first keyword in the second audio data such that second data representing the second user utterance is generated;

determining, from the second data, that the entirety of the first keyword is absent from the second data; and causing the speech processing to cease based at least in part on the entirety of the first keyword being absent from the second data.

16. The device of claim 13, the operations further comprising:

based at least in part on determining that the portion of the first audio data corresponds to the first part of the first keyword, selecting a first speech processing component associated with the first keyword to perform speech processing on the first audio data, wherein performing the speech processing is performed by the first speech processing component;

receiving second audio data representing a second user utterance;

detecting a first portion of a second keyword from the second audio data;

selecting a second speech processing component associated with the second keyword based at least in part on detecting the first portion of the second keyword; and performing, using the second speech processing component, speech processing on the second audio data.

17. The device of claim 13, the operations further comprising:

storing second data indicating a first confidence threshold for detecting the first part of the first keyword;

receiving third data indicating when both the first part of the first keyword is detected and the entirety of the first keyword is detected in sample audio data; and generating, based at least in part on the third data, fourth data indicating a second confidence threshold for detecting the first part of the first keyword, the second confidence threshold differing from the first confidence threshold.

18. The device of claim 13, wherein:

determining that the at least the portion of the first audio data corresponds to the first part of the first keyword is performed utilizing a wakeword model of a wakeword engine disposed on a device that received the first audio data; and detecting the entirety of the first keyword is performed by the wakeword engine based at least in part on the wakeword model determining that the at least the portion of the first audio data corresponds to the first keyword.

19. The device of claim 13, wherein:

determining that the at least the portion of the first audio data corresponds to the first part of the first keyword is performed utilizing a first wakeword model of a wakeword engine disposed on a device that received the first audio data and configured to detect the first part of the first keyword; and detecting the entirety of the first keyword is performed by the wakeword engine utilizing a second wakeword model configured to detect the entirety of the first keyword.

20. The device of claim 13, the operations further comprising:

receiving second audio data representing a second user utterance;

detecting, prior to sending the second audio data to a wakeword engine of a device that received the first audio data, a feature of the second audio data that corresponds to the first part of the first keyword;

initiating, on the device, speech processing on the second audio data based at least in part on detecting the feature;

detecting, at the wakeword engine, the entirety of the wakeword; and causing the speech processing to continue based at least in part on the entirety of the first keyword being detected at the wakeword engine.

* * * * *